(12) United States Patent
Fujii et al.

(10) Patent No.: US 11,635,040 B1
(45) Date of Patent: Apr. 25, 2023

(54) ENGINE CONTROLLING METHOD AND ENGINE SYSTEM

(71) Applicant: Mazda Motor Corporation, Hiroshima (JP)

(72) Inventors: Takuma Fujii, Aki-gun (JP); Takayuki Hikita, Aki-gun (JP); Saori Mizuno, Aki-gun (JP); Mitsuhiro Muto, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 17/943,080

(22) Filed: Sep. 12, 2022

(30) Foreign Application Priority Data

Oct. 1, 2021 (JP) .............................. JP2021-162576

(51) Int. Cl.
| | | |
|---|---|---|
| *F02D 41/00* | (2006.01) | |
| *F02D 41/40* | (2006.01) | |
| *F02D 41/30* | (2006.01) | |
| *F02D 35/02* | (2006.01) | |

(52) U.S. Cl.
CPC ......... *F02D 41/401* (2013.01); *F02D 35/026* (2013.01); *F02D 41/009* (2013.01); *F02D 41/3035* (2013.01); *F02D 2200/602* (2013.01); *F02D 2250/18* (2013.01)

(58) Field of Classification Search
CPC ...... F02D 41/30; F02D 41/40; F02D 41/3035; F02D 35/026; F02D 2200/602; F02D 2250/18
See application file for complete search history.

(56) References Cited

U.S. PATENT DOCUMENTS

| | | | | |
|---|---|---|---|---|
| 10,767,577 | B2* | 9/2020 | Sueoka | ............... F02D 13/0219 |
| 10,982,616 | B2* | 4/2021 | Inoue | .................. F02D 41/0065 |
| 2014/0069382 | A1* | 3/2014 | Iwai | ...................... F02D 41/401 |
| | | | | 123/406.47 |
| 2019/0063350 | A1* | 2/2019 | Inoue | ..................... F02D 41/401 |
| 2019/0101071 | A1 | 4/2019 | Inoue et al. | |
| 2020/0325841 | A1* | 10/2020 | Kamiji | ................. F02D 41/009 |
| 2022/0154666 | A1* | 5/2022 | Kaminaga | ........... F02D 13/0207 |

FOREIGN PATENT DOCUMENTS

JP WO2018096744 A1 5/2018

\* cited by examiner

*Primary Examiner* — John Kwon
(74) *Attorney, Agent, or Firm* — Alleman Hall Creasman & Tuttle LLP

(57) ABSTRACT

A method of controlling an engine is provided, which includes setting, by a controller, a target torque of the engine in a specific cycle in the future by a given delay time from the present time based on a present accelerator opening. The method includes selecting beforehand, by the controller, combustion in the specific cycle according to the target torque, from flame propagation combustion and compressed self-ignition combustion. The method includes outputting, by the controller, a control signal to a property adjusting device before the specific cycle so that a property inside the cylinder in the specific cycle becomes a property corresponding to the selected combustion. The method includes estimating, by the controller, the property at a timing when an intake valve is closed in the specific cycle. The method includes outputting, by the controller, a control signal corresponding to the estimated property to a spark plug or an injector.

17 Claims, 15 Drawing Sheets

ENGINE CONTROLLING METHOD AND ENGINE SYSTEM

TECHNICAL FIELD

The technique disclosed herein belongs to a technical field related to an engine controlling method and an engine system.

BACKGROUND OF THE DISCLOSURE

Conventionally, it is known that compressed self-ignition combustion (hereinafter, referred to as CI (Compression Ignition) combustion) improves thermal efficiency of an engine.

For example, WO2018/096744A1 discloses an engine system in which SPCCI (Spark Controlled Compression Ignition) combustion which is a combination of SI (Spark Ignition) combustion using a spark plug and the CI combustion is carried out in part of the operating state of an engine. This engine system carries out the SI combustion when the engine operating state is other than an operating state in which the SPCCI combustion is carried out. This engine is configured to switch the combustion mode when the engine load is changed. Note that since in the SI combustion a mixture gas combusts by flame propagation after ignition, the SI combustion will be treated below as a synonymous with flame propagation combustion.

Meanwhile, the CI combustion is greatly influenced by in-cylinder properties. For example, when the in-cylinder properties change greatly, such as a transition state where a driver steps on an accelerator pedal, target in-cylinder properties (an in-cylinder temperature, an Exhaust Gas Recirculation (EGR) rate, etc.) are not formed appropriately, and therefore, the ignition timing may be retarded to lower combustion stability, or the ignition timing may be advanced to increase combustion noise.

SUMMARY OF THE DISCLOSURE

Thus, the technique disclosed herein is made in view of this regard, and one purpose thereof is to form target in-cylinder properties with sufficient accuracy to stabilize compressed self-ignition combustion in a transition state.

In order to solve the problem described above, a method of controlling an engine disclosed herein includes setting, by a controller, a target torque of the engine in a specific cycle in the future by a given delay time from a present time based on a present accelerator opening, in response to reception of a detection signal from an accelerator operation detector. The method includes preselecting, by the controller, combustion in the specific cycle according to the target torque, from flame propagation combustion in which fuel inside a cylinder is forcibly ignited using a spark plug and compressed self-ignition combustion in which fuel inside the cylinder carries out compressed self-ignition without using the spark plug. The method includes outputting, by the controller, a control signal to a property adjusting device before the specific cycle so that a property inside the cylinder in the specific cycle becomes a property corresponding to the selected combustion. The method includes estimating, by the controller, the property at a timing when an intake valve is closed in the specific cycle based on a sensor signal measured in the specific cycle. The method includes outputting, by the controller, a control signal corresponding to the estimated property to the spark plug or the injector so that the preselected combustion is realized in the specific cycle.

That is, this technique utilizes that the given delay time is set between a driver performing the accelerator operation and the torque of the engine being changed in response to the accelerator operation. Since the response of the vehicle behavior to the accelerator operation is delayed, the driver can prepare for the posture of a vehicle acceleration after the accelerator operation, which can suppress a burden due to a sudden movement of the vehicle acting on the driver. Therefore, the driver hardly feels uncomfortable in acceleration, and drivability improves.

According to this configuration, the controller receives the detection signal from the accelerator operation detector, and based on the present accelerator opening, sets the target torque of the engine. The target torque is the target torque of the engine in the specific cycle in the future by the given delay time from the present time. Therefore, the vehicle behavior responds to the accelerator operation with the suitable delay.

When the target torque in the specific cycle is set, the controller preselects the combustion in the specific cycle from the flame propagation combustion and the compressed self-ignition combustion, according to the target torque. For example, a relationship between the engine load corresponding to the torque and the combustion mode corresponding to the engine load may be preset, and the controller may select the combustion in the specific cycle based on the relationship.

The controller outputs the control signal to the property adjusting device before the specific cycle. The response time from the controller outputting the control signal until the in-cylinder property changing into the desired property is comparatively long. By the controller outputting beforehand the control signal to the property adjusting device, the in-cylinder property when reaching the specific cycle is the property corresponding to the selected combustion, or is brought closer to the property corresponding to the selected combustion.

The controller estimates the property at the timing when the intake valve is closed in the specific cycle based on the sensor signal measured in the specific cycle. The controller can determine whether the in-cylinder property in the specific cycle is the property corresponding to the selected combustion, or deviates from the property corresponding to the selected combustion.

The controller outputs the control signal corresponding to the estimated property to the spark plug or the injector. When the flame propagation combustion is performed in the specific cycle, the ignition timing of the spark plug and/or the injection timing or the injection amount of the injector are adjusted according to the in-cylinder property. Thus, the flame propagation combustion in the specific cycle is optimized. Further, when the compressed self-ignition combustion is performed in the specific cycle, the injection timing or the injection amount of the injector is adjusted according to the in-cylinder property. Thus, the compressed self-ignition combustion in the specific cycle is optimized.

Thus, according to this controlling method, by setting beforehand the target property in the future cycle, the controller can output beforehand the control signal to the property adjusting device, and therefore, the in-cylinder property in the specific cycle can be made the target property. Also in the transition state in which the target torque of the engine changes every moment, the in-cylinder property in each cycle becomes the target property corresponding to the target torque. Also when the compressed self-ignition combustion is performed in the transition state, the combustion becomes stable.

Further, even if the in-cylinder property in the specific cycle deviates from the target property, the ignition timing of the spark plug and/or the injection timing or the injection amount of the injector in the specific cycle are adjusted according to the property. By this adjustment, the flame propagation combustion or the compressed self-ignition combustion in the specific cycle is optimized, which also contributes to the stabilization of the compressed self-ignition combustion in the transition state.

The controller may perform the preselection of combustion for every cylinder.

In a multi-cylinder engine having a plurality of the cylinders, in the transition state where the target torque changes, the target torque is different for every cylinder. By the controller selecting the combustion for every cylinder individually, the combustion in each cylinder in the transition state corresponds to the target torque.

The property adjusting device may include at least one of a throttle valve, a variable valve operating mechanism, and an Exhaust Gas Recirculation (EGR) valve.

In these property adjusting devices, the response time of the devices from the reception of the control signal from the controller until the change to the target opening or the target position is long, and the response time until the in-cylinder property reaching the target property after these devices are changed to the target opening or the target position is also long. By the controller outputting beforehand the control signal to these devices, the property in the specific cycle can be made to be the target property or close to the target property.

The controller may estimate the property at a timing when the intake valve is closed, before the intake valve is closed in the specific cycle.

Since the property is estimated before the closing of the intake valve, the controller can output the control signal corresponding to the property to the injector, for example, even before the closing of the intake valve. Even if the in-cylinder property deviates from the target property, as described above, the combustion is optimized by the injection timing or the injection amount of fuel being adjusted.

The controller may estimate at least a temperature inside the cylinder at a timing when the intake valve is closed, and output the control signal at least to the injector.

The compressed self-ignition combustion is greatly influenced by the in-cylinder temperature. That is, when the temperature is high, the fuel is easy to carry out the compressed self-ignition, and when it is low, the fuel is difficult to carry out the compressed self-ignition. When the injection amount and/or the injection timing of fuel into the cylinder are adjusted, for example during compression stroke, according to the in-cylinder temperature, the compressed self-ignition can be promoted or suppressed. Therefore, the compression ignition combustion is optimized.

The technique disclosed herein relates to an engine system which includes an engine mounted on a vehicle and having an injector, a spark plug, and a property adjusting device, an accelerator operation detector configured to detect operation of an accelerator pedal of the vehicle, and a controller configured to output a control signal to each of the injector, the spark plug, and the property adjusting device, based on a detection signal from the accelerator operation detector. The engine selectively performs flame propagation combustion in which fuel injected into a cylinder from the injector is forcibly ignited using the spark plug, and compressed self-ignition combustion in which fuel injected into the cylinder from the injector carries out compressed self-ignition without using the spark plug. The controller receives the detection signal from the accelerator operation detector, and sets a target torque of the engine in a specific cycle in the future by a given delay time from a present time, based on a present accelerator opening. The controller preselects combustion in the specific cycle according to the target torque from the flame propagation combustion and the compressed self-ignition combustion. The controller outputs a control signal to the property adjusting device before the specific cycle so that a property inside the cylinder in the specific cycle becomes a property corresponding to the selected combustion. The controller estimates the property at a timing when the intake valve is closed in the specific cycle, based on a sensor signal measured in the specific cycle. The controller outputs a control signal corresponding to the estimated property to the spark plug or the injector so that the preselected combustion is realized in the specific cycle.

According to this configuration, since the controller sets beforehand the target property in the future specific cycle and outputs beforehand the control signal to the property adjusting device, the in-cylinder property in the specific cycle can be made the target property. Since the in-cylinder property in each cycle in the transition state becomes the target property, the combustion is stabilized also when the compressed self-ignition combustion is carried out in the transition state.

Further, even if the in-cylinder property in the specific cycle deviates from the target property, since the ignition timing of the spark plug and/or the injection timing or the injection amount of the injector in the specific cycle are adjusted, the flame propagation combustion or the compressed self-ignition combustion in the specific cycle is optimized, which also contributes to the stabilization of the compressed self-ignition combustion in the transition state.

BRIEF DESCRIPTION OF DRAWINGS

FIG. 13A illustrates a conventional controlling method, and FIG. 13B illustrates a controlling method of one embodiment.

DETAILED DESCRIPTION OF THE DISCLOSURE

Hereinafter, one embodiment of an engine controlling method and an engine system is described with reference to the accompanying drawings. The engine system described herein is merely illustration.

Figure 1:
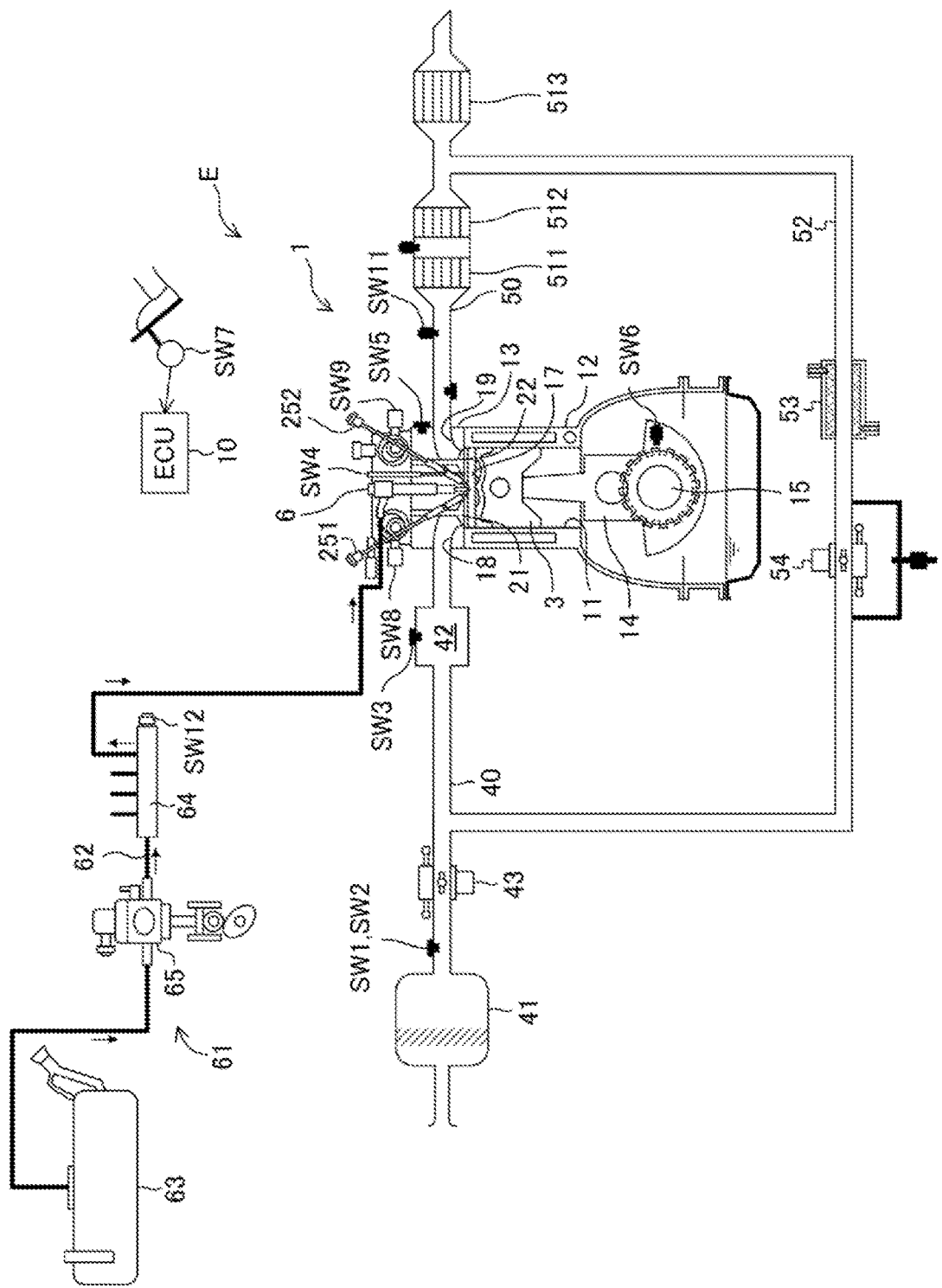
FIG. 1 is a view illustrating an engine system.
Figure 2:
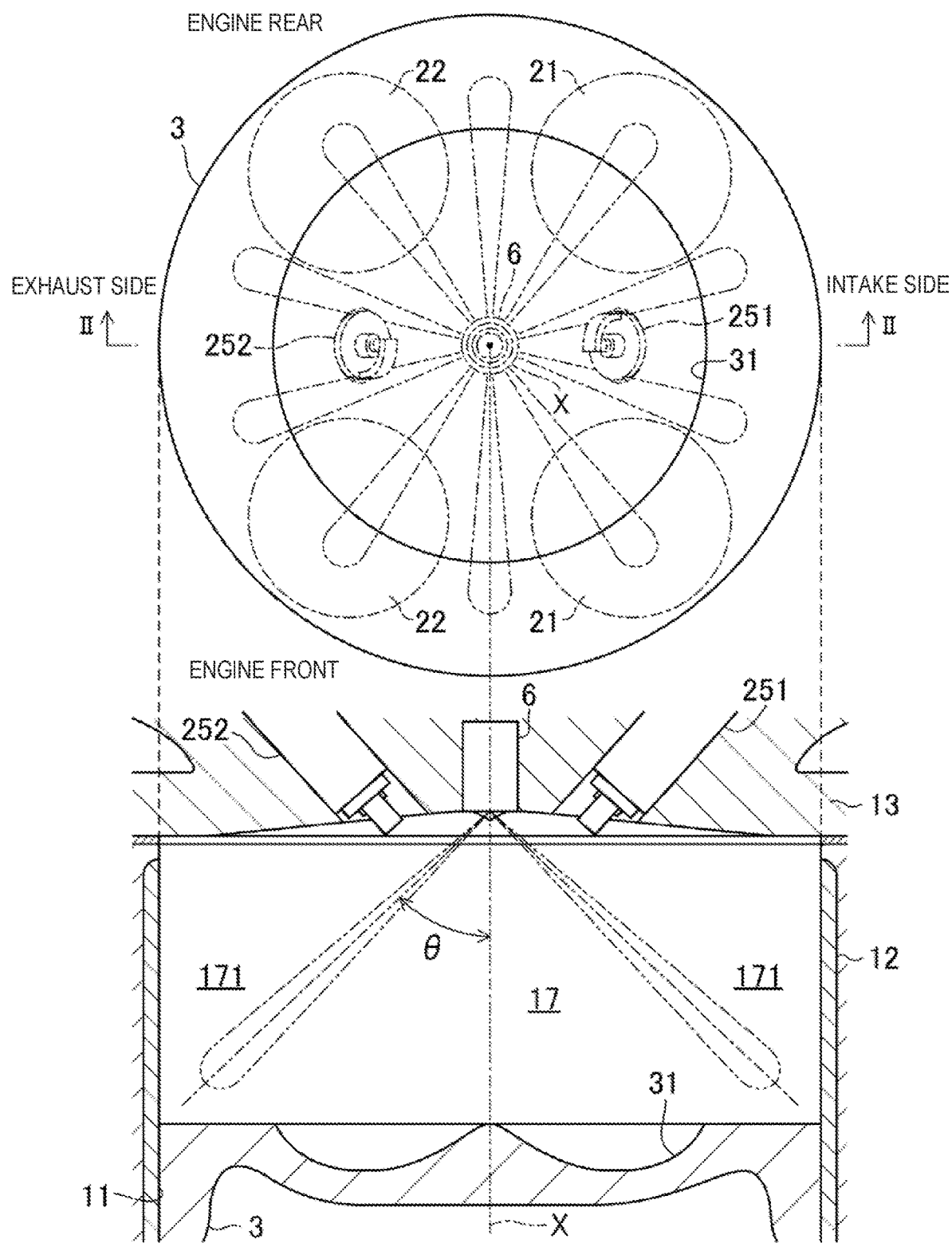
FIG. 2 illustrates a structure of a combustion chamber of an engine, where the upper figure is a plan view, and the lower figure is a cross-sectional view taken along a line II-II of the upper figure.
Figure 3:
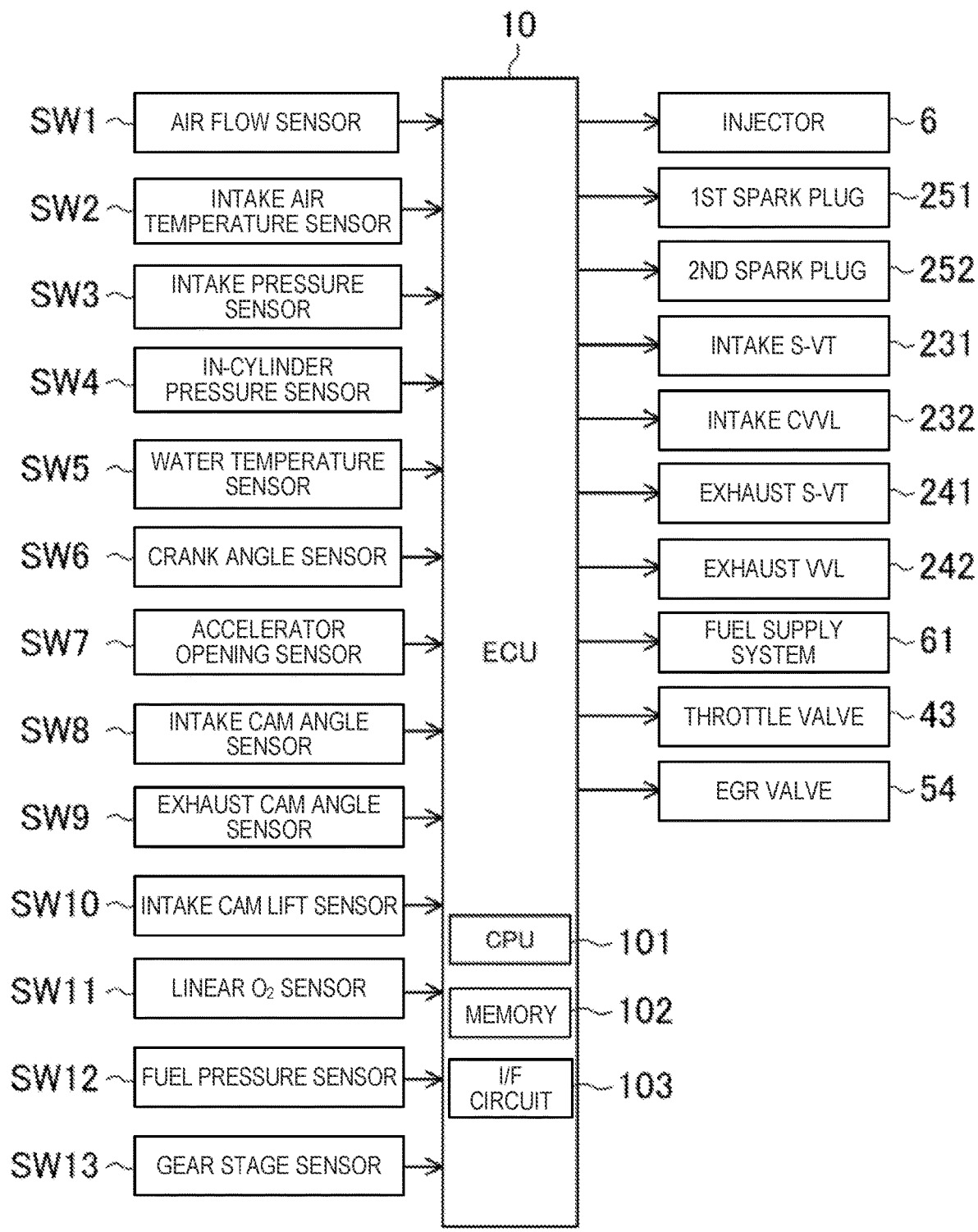
FIG. 3 is a block diagram of the engine system.

FIG. 1 is a view illustrating the engine system. FIG. 2 is a view illustrating a structure of a combustion chamber of an engine. The positions of the intake side and the exhaust side in FIG. 1 and the positions of the intake side and the exhaust side in FIG. 2 are opposite. FIG. 3 is a block diagram illustrating an engine controller.

An engine system E is mounted on a four-wheeled automobile (vehicle). The engine system E includes an engine 1 and a controller which controls the engine 1. The controller is an ECU (Engine Control Unit) 10 which will be described later.

The engine 1 has a cylinder 11. In the cylinder 11, intake stroke, compression stroke, expansion stroke, and exhaust stroke are repeated. The engine 1 is a four-stroke engine. As the engine 1 operates, the automobile travels. Fuel of the engine 1 is gasoline in this example configuration. The engine 1 may be configured so that a mixture gas combusts by self-ignition in at least a part of its operating range.

(Engine Configuration)

The engine 1 includes a cylinder block 12 and a cylinder head 13. The cylinder head 13 is placed on the cylinder block 12. A plurality of the cylinders 11 are formed inside the cylinder block 12. The engine 1 is a multi-cylinder engine with four cylinders 11. As one example, in the engine 1, the four cylinders 11 comprised of a first cylinder, a second cylinder, a third cylinder, and a fourth cylinder, are lined up single file. The four cylinders 11 perform combustion in order of the first cylinder, the third cylinder, the fourth cylinder, and the second cylinder. Note that, in FIG. 1, only one cylinder 11 is illustrated.

A piston 3 is inserted in each cylinder 11. The piston 3 is coupled to a crankshaft 15 via a connecting rod 14. The piston 3, the cylinder 11, and the cylinder head 13 form a combustion chamber 17. As illustrated in FIG. 2, a cavity 31 is formed in an upper surface of the piston 3. The cavity 31 is located in a center part of the upper surface of the piston 3.

The geometric compression ratio of the engine system E is set at a high ratio for the purpose of improvement in theoretical thermal efficiency. In detail, the geometric compression ratio of the engine system E is 15:1 or higher, and, for example, it is set to 20:1 or lower. As will be described later, in this engine system E, the mixture gas carries out compression ignition combustion in part of the operating range. The comparatively high geometric compression ratio stabilizes the compression ignition combustion.

An intake port 18 is formed inside the cylinder head 13 for every cylinder 11. The intake port 18 communicates with the cylinder 11.

An intake valve 21 is disposed at the intake port 18. The intake valve 21 opens and closes the intake port 18. The intake valve 21 is a poppet valve. A valve operating mechanism has an intake cam shaft, and is mechanically connected to the intake valves 21. The valve operating mechanism opens and closes the intake valves 21 at given timings. The valve operating mechanism is a variable valve operating mechanism with variable valve timing and/or valve lift. As illustrated in FIG. 3, the valve operating mechanism has an intake S-VT (Sequential-Valve Timing) 231. The intake S-VT 231 continuously changes a rotation phase of the intake cam shaft with respect to the crankshaft 15 within a given angle range. A valve opening period of the intake valve 21 does not change. The intake S-VT 231 is a variable phase mechanism. The intake S-VT 231 is of electric or hydraulic type.

Further, the valve operating mechanism has an intake CVVL (Continuously Variable Valve Lift) 232. The intake CVVL 232 can continuously change the lift of the intake valve 21 within a given range. The intake CVVL 232 may adopt various known configurations. As one example, as disclosed in JP2007-085241A, the intake CVVL 232 may be comprised of a linkage mechanism, a control arm, and a stepping motor. The linkage mechanism causes a cam for driving the intake valve 21 to pivot in both directions in an interlocked manner with rotation of the cam shaft. The control arm variably sets a lever ratio of the linkage mechanism. When the lever ratio of the linkage mechanism changes, a pivot amount of the cam which depresses the intake valve 21 changes. The stepping motor changes the pivot amount of the cam by electrically driving the control arm, thereby changing the lift of the intake valve 21.

An exhaust port 19 is formed inside the cylinder head 13 for every cylinder 11. The exhaust port 19 communicates with the cylinder 11.

An exhaust valve 22 is disposed at the exhaust port 19. The exhaust valve 22 opens and closes the exhaust port 19. The exhaust valve 22 is a poppet valve. The valve operating mechanism has an exhaust cam shaft and is mechanically connected to the exhaust valves 22. The valve operating mechanism opens and closes the exhaust valves 22 at given timings. The valve operating mechanism is a variable valve operating mechanism with variable valve timing and/or valve lift. As illustrated in FIG. 3, the valve operating mechanism has an exhaust S-VT 241. The exhaust S-VT 241 continuously changes a rotation phase of the exhaust cam shaft with respect to the crankshaft 15 within a given angle range. A valve opening period of the exhaust valve 22 does not change. The exhaust S-VT 241 is a variable phase mechanism. The exhaust S-VT 241 is of electric or hydraulic type.

Further, the valve operating mechanism has an exhaust VVL (Variable Valve Lift) 242. Although illustration is omitted, the exhaust VVL 242 is able to switch the cams which open and close the exhaust valves 22. The exhaust VVL 242 may adopt various known configurations. As one example, as disclosed in JP2018-168796A, the exhaust VVL 242 has a first cam, a second cam, and a switching mechanism which switches between the first cam and the second cam. The first cam opens and closes the exhaust valve 22 in exhaust stroke. The second cam opens and closes the exhaust valve 22 in the exhaust stroke, and again opens and closes the exhaust valve 22 in intake stroke. Note that the second cam may open the exhaust valve 22 in exhaust stroke, and then maintain the open state of the exhaust valve 22 up to intake stroke. The exhaust VVL 242 can change a lift of the exhaust valve 22 by opening and closing the exhaust valve 22 by one of the first cam and the second cam.

The intake S-VT 231, the intake CVVL 232, the exhaust S-VT 241, and the exhaust VVL 242 adjust an amount of air introduced into the cylinder 11, and an amount of burnt gas introduced into the cylinder 11 (internal Exhaust Gas Recirculation (EGR) amount) by controlling opening and closing of the intake valve 21 and the exhaust valve 22.

An injector 6 is attached to the cylinder head 13 for every cylinder 11. The injector 6 injects fuel directly into the cylinder 11.

Although detailed illustration is omitted, the injector 6 is of a multiple nozzle hole type with a plurality of nozzle holes. As illustrated by two-dot chain lines in FIG. 2, the injector 6 injects fuel so that the fuel spreads radiately from the center part of the cylinder 11 toward the periphery. As illustrated in the lower figure of FIG. 2, the axis of the nozzle holes of the injector 6 has a given angle θ with respect to a center axis X of the cylinder 11. Note that although in the illustrated example the injector 6 has ten nozzle holes disposed at equal angle positions in the circumferential direction, the number and the layout of the nozzle holes are not limited in particular.

A fuel supply system 61 is connected to the injectors 6. The fuel supply system 61 includes a fuel tank 63 which stores fuel, and a fuel supply line 62 which couples the fuel tank 63 to the injectors 6. A fuel pump 65 and a common rail 64 are provided in the fuel supply line 62. The fuel pump 65 pumps fuel to the common rail 64. The common rail 64 stores the fuel pumped from the fuel pump 65, at high fuel pressure. When the valve of the injector 6 opens, the fuel stored in the common rail 64 is injected into the cylinder 11 from the nozzle holes of the injector 6. Note that the configuration of the fuel supply system 61 is not limited to the above-described configuration.

A first spark plug 251 and a second spark plug 252 are attached to the cylinder head 13 for every cylinder 11. The first spark plug 251 and the second spark plug 252 each forcibly ignite the mixture gas inside the cylinder 11. Note that the number of spark plugs may be one in each cylinder 11. The first spark plug 251 is disposed on the intake side of the center axis X of the cylinder 11, and the second spark plug 252 is disposed on the exhaust side of the center axis X. The first spark plug 251 and the second spark plug 252 are disposed so as to oppose to each other.

An intake passage 40 is connected to one of side surfaces of the engine 1. The intake passage 40 communicates with the intake port 18 of each cylinder 11. Air introduced into the cylinder 11 flows through the intake passage 40. An air cleaner 41 is disposed at an upstream end of the intake passage 40. The air cleaner 41 filters air. A surge tank 42 is disposed near a downstream end of the intake passage 40. A part of the intake passage 40 downstream of the surge tank 42 constitutes independent intake passages branched for the cylinders 11. A downstream end of the independent intake passage is connected to the intake port 18 of each cylinder 11.

A throttle valve 43 is disposed in the intake passage 40, between the air cleaner 41 and the surge tank 42. The throttle valve 43 adjusts the introducing amount of air into the cylinder 11 by adjusting the valve opening.

An exhaust passage 50 is connected to the other side surface of the engine 1. The exhaust passage 50 communicates with the exhaust port 19 of each cylinder 11. The exhaust passage 50 is a passage through which exhaust gas discharged from the cylinder 11 flows. Although detailed illustration is omitted, an upstream part of the exhaust passage 50 constitutes independent exhaust passages branched for the cylinders 11. An upstream end of the independent the exhaust passage is connected to the exhaust port 19 of each cylinder 11.

An exhaust emission control system having a plurality of catalytic converters is disposed at the exhaust passage 50. An upstream catalytic converter has a three-way catalyst 511 and a GPF (Gasoline Particulate Filter) 512, for example. A downstream catalytic converter has a three-way catalyst 513. Note that the exhaust emission control system is not limited to the configuration of the illustrated example. For example, the GPF may be omitted. The catalytic converter is not limited to what has the three-way catalyst. Further, the disposed order of the three-way catalyst and the GPF may be changed suitably.

An EGR passage 52 is connected between the intake passage 40 and the exhaust passage 50. The EGR passage 52 is a passage for recirculating part of exhaust gas to the intake passage 40. An upstream end of the EGR passage 52 is connected to the exhaust passage 50, between the upstream catalytic converter and the downstream catalytic converter. A downstream end of the EGR passage 52 is connected to the intake passage 40, between the throttle valve 43 and the surge tank 42.

A water-cooled EGR cooler 53 is disposed at the EGR passage 52. The EGR cooler 53 cools exhaust gas. Further, an EGR valve 54 is disposed at the EGR passage 52. The EGR valve 54 adjusts a flow rate of exhaust gas which flows through the EGR passage 52. When the opening of the EGR valve 54 is adjusted, a recirculating amount of external EGR gas is adjusted.

As illustrated in FIG. 3, the engine system E includes the ECU (Engine Control Unit) 10 for operating the engine 1. The ECU 10 is a controller based on a well-known microcomputer. The ECU 10 includes a CPU (Central Processing Unit) 101 which executes a program, memory 102 which is comprised of, for example, RAM (Random Access Memory) and ROM (Read Only Memory) and stores the program and data, and an interface (I/F) circuit 103 which inputs/outputs an electric signal. The ECU 10 is one example of a controller.

As illustrated in FIGS. 1 and 3, various kinds of sensors SW1-SW13 are electrically connected to the ECU 10. The sensors SW1-SW13 each output a signal to the ECU 10. The sensors include the following sensors:

an air-flow sensor SW1 which is disposed at the intake passage 40 downstream of the air cleaner 41, and measures a flow rate of air which flows through the intake passage 40;

an intake air temperature sensor SW2 which is disposed at the intake passage 40 downstream of the air cleaner 41, and measures a temperature of the air which flows through the intake passage 40;

an intake pressure sensor SW3 which is attached to the surge tank 42, and measures a pressure of air which is introduced into the cylinder 11;

an in-cylinder pressure sensor SW4 which is attached to the cylinder head 13 corresponding to each cylinder 11, and measures a pressure inside each cylinder 11;

a water temperature sensor SW5 which is attached to the engine 1, and measures a temperature of coolant;

a crank angle sensor SW6 which is attached to the engine 1, and measures a rotation angle of the crankshaft 15;

an accelerator opening sensor SW7 which is attached to an accelerator pedal mechanism, and measures an accelerator opening corresponding to an operating amount of the accelerator;

an intake cam angle sensor SW8 which is attached to the engine 1, and measures a rotation angle of the intake cam shaft;

an exhaust cam angle sensor SW9 which is attached to the engine 1, and measures a rotation angle of the exhaust cam shaft;

an intake cam lift sensor SW10 which is attached to the engine 1, and measures a lift of the intake valve 21;

a linear $O_2$ sensor SW11 which is attached to the exhaust passage 50, and measures an oxygen concentration of exhaust gas;

a fuel pressure sensor SW12 which is attached to the common rail 64, and measures a pressure of fuel which is injected into the cylinder 11 through the injector 6; and a gear stage sensor SW13 which is attached to a transmission (not illustrated) and a shift lever (not illustrated), and measures a current gear stage.

The ECU 10 determines the operating state of the engine 1 based on the signals from the sensors SW1-SW13, and calculates a controlled variable of each device according to control logic defined beforehand. The control logic is stored in the memory 102. The control logic includes calculating a target amount and/or a controlled variable by using a map stored in the memory 102.

The ECU 10 outputs electric signals according to the calculated controlled variables to the injector 6, the first spark plug 251, the second spark plug 252, the intake S-VT 231, the intake CVVL 232, the exhaust S-VT 241, the exhaust VVL 242, the fuel supply system 61, the throttle valve 43, and the EGR valve 54.

(Engine Operation Control Map)

Figure 4:
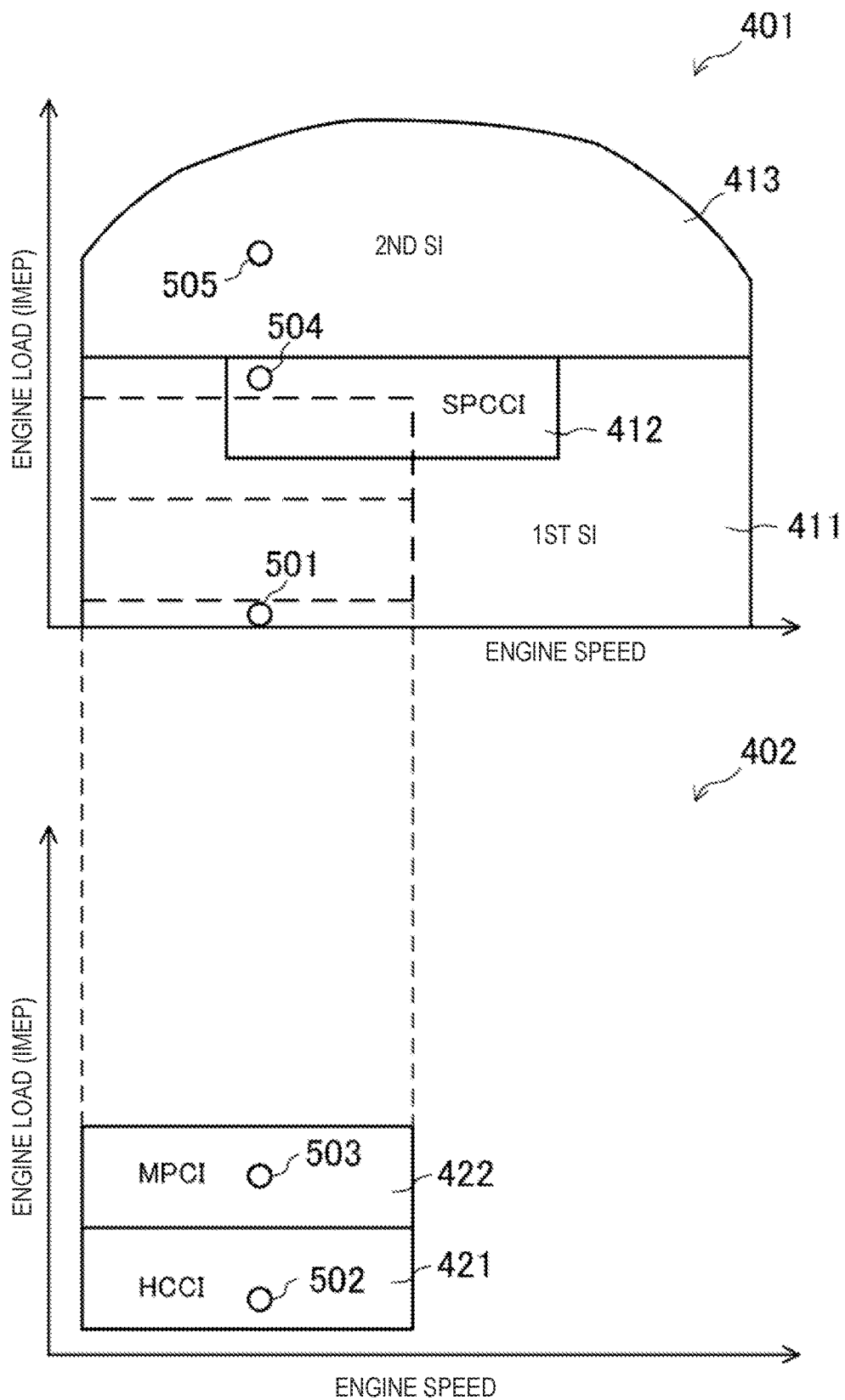
FIG. 4 is a view illustrating a map according to operation of the engine.

FIG. 4 illustrates a base map according to control of the engine 1. The base map is stored in the memory 102 of the ECU 10. The base map includes a first base map 401 and a second base map 402. The ECU 10 uses a map selected from the two kinds of base maps according to the coolant temperature and the gear stage of the engine 1, for the control of the engine 1. The first base map 401 is a base map when the engine 1 is cold. The second base map 402 is a base map when the engine 1 is warm.

As described later, the second base map 402 is a map on which the compressed self-ignition combustion is set. When the water temperature is higher than a given temperature, the ECU 10 can select the second base map 402. When the water temperature is below the given temperature, the ECU 10 cannot select the second base map 402. It is because the compressed self-ignition combustion is unstable when the water temperature is low. Further, when the gear stage of the transmission is a high-speed stage, the ECU 10 can select the second base map 402. When the gear stage of the transmission is a low-speed stage, the ECU 10 cannot select the second base map 402. Since the compressed self-ignition combustion is relatively high in combustion noise, the compressed self-ignition combustion is performed only when the gear stage of the transmission is the high-speed stage and the vehicle speed is comparatively high.

Note that although in the upper figure and the lower figure of FIG. 4 the vertical axis is, strictly speaking, an Indicated Mean Effective Pressure (IMEP), since the indicated mean effective pressure is an equalized gas pressure of the combustion and is equivalent to the engine load, it will not be a problem in particular.

The first base map 401 and the second base map 402 are defined by the load and the engine speed of the engine 1. The first base map 401 is roughly divided into three ranges of a first range, a second range, and a third range, according to the load and the engine speed. In more detail, the first range corresponds to a low-and-middle-load range 411 which includes in the load direction a range from a low-load range including idle operation to a middle-load range and extends in the engine speed direction entirely from a low-speed range to a high-speed range. The second range is a range within the first range, and corresponds to a middle-load middle-speed range 412 which includes the middle-load range in the load direction and is in a middle-speed range in the engine speed direction. The third range corresponds to a high-load range 413 which includes in the load direction a high-load range including the maximum load and extends in the engine speed direction entirely from the low-speed range to the high-speed range.

The second base map 402 is roughly divided into two ranges of a first range and a second range according to the load and the engine speed. In more detail, the first range corresponds to a low-load low-and-middle-speed range 421 which includes the low-load range in the load direction and extends from the low-speed range to the middle-speed range in the engine speed direction. The second range corresponds to a middle-load low-and-middle-speed range 422 which includes the middle-load range in the load direction and extends from the low-speed range to the middle-speed range in the engine speed direction. As illustrated by broken lines in the upper figure of FIG. 4, both the low-load low-and-middle-speed range 421 and the middle-load low-and-middle-speed range 422 of the second base map 402 overlap with the low-and-middle-load range 411 and the middle-load middle-speed range 412 of the first base map 401.

Here, the low-load range, the middle-load range, and the high-load range may be defined by substantially equally dividing the entire operating range of the engine 1 into three in the load direction.

Further, the low-speed range, the middle-speed range, and the high-speed range may be defined by substantially equally dividing the entire operating range of the engine 1 into three in the engine speed direction.

(Engine Combustion Mode)

Next, operation of the engine 1 in each range is described in detail. The ECU 10 changes the open-and-close operations of the intake valve 21 and the exhaust valve 22, the injection timing of fuel, and the existence of ignition, according to the demanded load to the engine 1, the engine speed of the engine 1, the temperature of the coolant, the gear stage, etc. First, the ECU 10 sets a target IMEP (or demanded load) based on a target torque. Then, the ECU 10 applies the target IMEP and the engine speed of the engine 1 to the first base map 401 or the second base map 402, and determines a combustion mode. Then, according to the determined combustion mode, it switches the combustion mode of the mixture gas inside the cylinder 11 by changing the open-and-close operations of the intake valve 21 and the exhaust valve 22, the injection timing of fuel, and the existence of ignition.

As illustrated in FIG. 4, this engine 1 switches the combustion mode among HCCI combustion, MPCI combustion, SPCCI combustion, first SI combustion, and second SI combustion. The HCCI (Homogeneous Charged Compression Ignition) combustion and the MPCI combustion are included in the compressed self-ignition combustion (CI Combustion). The first SI combustion and the second SI combustion are included in flame propagation combustion (SI Combustion). The SPCCI combustion is included in partial compression ignition combustion, and in a broader sense, it is included in the flame propagation combustion (SI Combustion).

Figure 5:
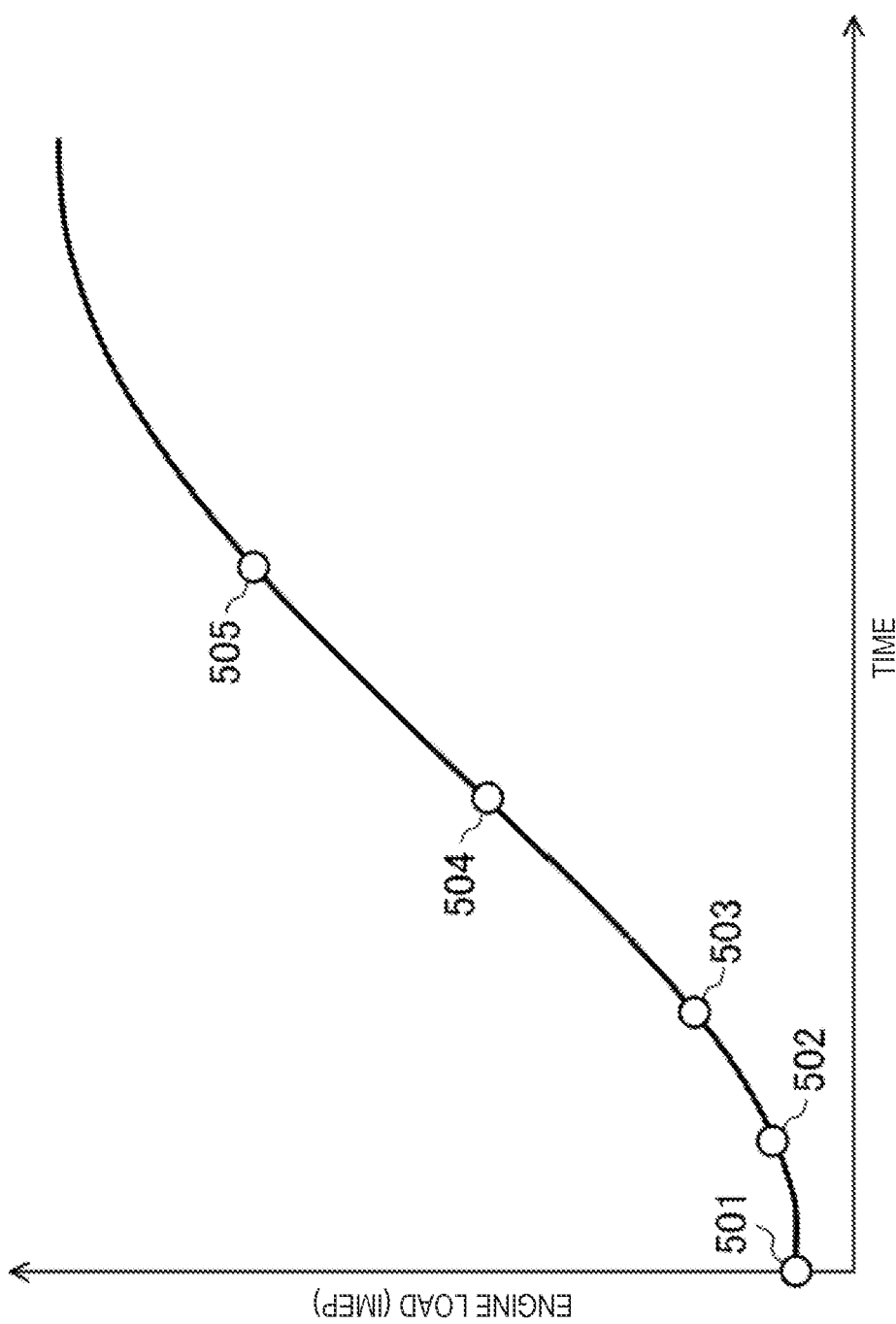
FIG. 5 is a view illustrating a change in an engine load in a transition state.

FIG. 5 illustrates a change in the demanded load during a transition state, such as during acceleration. Circles 501-505 illustrated in FIG. 5 correspond to circles 501-505 in FIG. 4. Here, it is assumed that the engine speed of the engine 1 is constant, the water temperature is a temperature at which is the HCCI combustion and the MPCI combustion can be selected, and the gear stage is a gear stage at which the HCCI combustion and the MPCI combustion can be selected.

The demanded load in the case of the circle 501 is a load at which the first SI combustion is possible. At this time, the ECU 10 selects the first SI combustion. Next, the demanded load in the case of the circle 502 is a load at which both the first SI combustion and the HCCI combustion are possible. Here, the second base map 402 is selectable as described above. At this time, the ECU 10 selects the HCCI combustion. When the demanded load becomes high, the ECU 10 selects the MPCI combustion in the case of the circle 503. When the demanded load becomes even higher to the load of the circle 504, and the MPCI combustion cannot be selected, the ECU 10 selects the SPCCI combustion. Then, when the demanded load is the load of the circle 505, the ECU 10 selects the second SI combustion.

Note that as described later in detail, in this embodiment, the ECU 10 sets the combustion mode from the present cycle to a specific cycle based on the target torque set based on the accelerator opening detected by the accelerator opening sensor SW7 so that the target torque is realized in the specific cycle which is future from the present time by a given delay time td.

Figure 6:
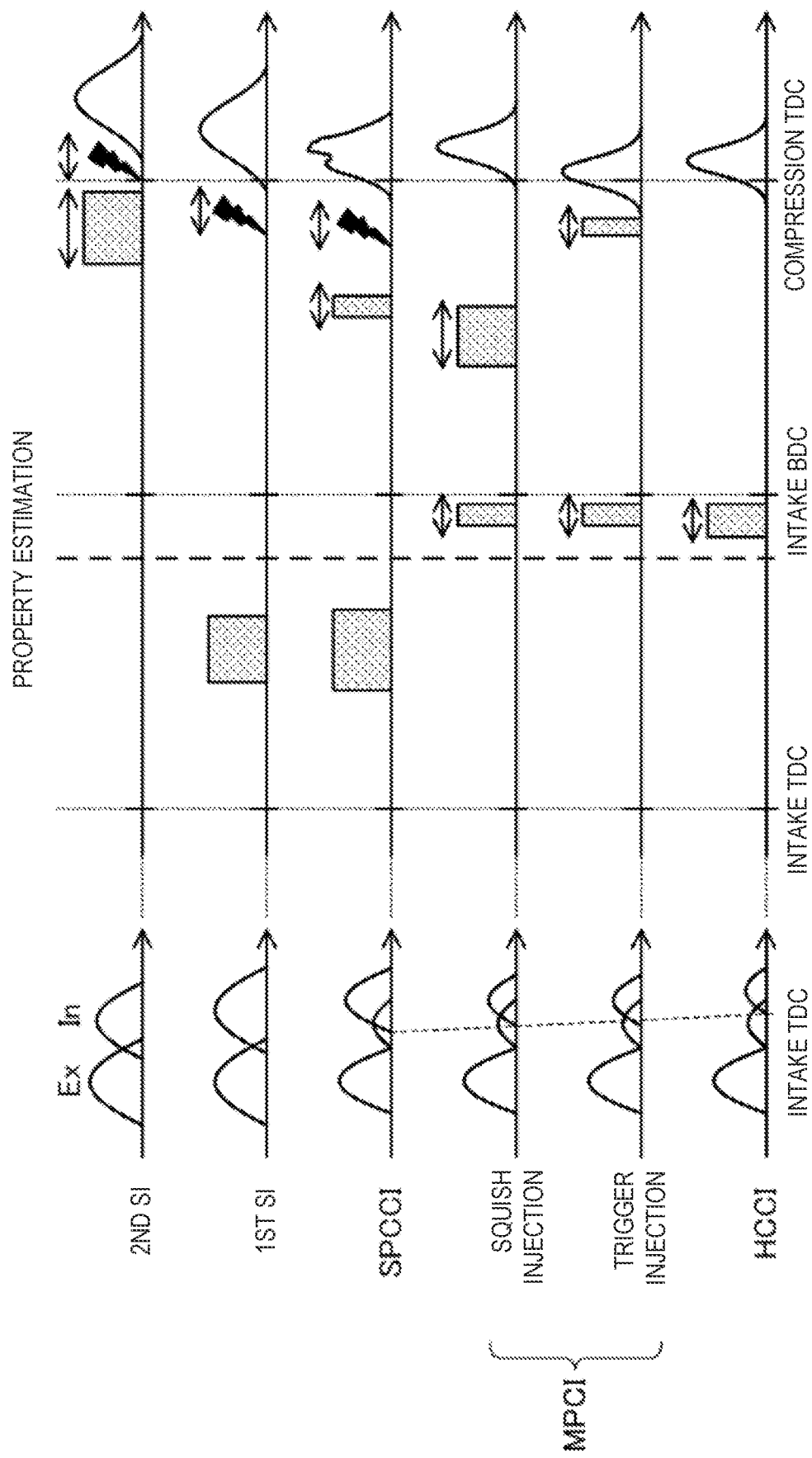
FIG. 6 is a view illustrating open-and-close operations of an intake valve and an exhaust valve, a fuel injection timing, and an ignition timing, in each combustion mode.

FIG. 6 illustrates the open-and-close operations of the intake valve 21 and the exhaust valve 22, the injection timing of fuel, and the ignition timing, and a waveform of a rate of heat release which occurs inside the cylinder 11 when the mixture gas combusts, corresponding to each combustion mode. The crank angle advances from the left to the right in FIG. 6. Below, each combustion mode is described when the engine 1 is warm as one example.

(HCCI Combustion)

When the operating state of the engine 1 is within the first range of the second base map 402 (i.e., the low-load low-and-middle speed range 421), the ECU 10 carries out the compression ignition combustion of the mixture gas inside the cylinder 11. In more detail, when the operating state of the engine 1 is within the low-load low-and-middle-speed range 421, the exhaust VVL 242 opens and closes the exhaust valve 22 twice. That is, the exhaust VVL 242 performs a change between the first cam and the second cam. The exhaust valve 22 opens in exhaust stroke and closes in intake stroke. The exhaust S-VT 241 sets the opening-and-closing timing of the exhaust valve 22 at a given timing. The intake S-VT 231 retards the opening-and-closing timing of the intake valve 21. The intake CVVL 232 sets the lift of the intake valve 21 to a small amount. The close timing of the intake valve 21 is the most retarded.

By the opening-and-closing mode of the intake valve 21 and the exhaust valve 22, a comparatively small amount of air and a large amount of burnt gas are introduced into the cylinder 11. Fundamentally, the burnt gas is internal EGR gas which remains inside the cylinder 11. The large amount of internal EGR gas introduced into the cylinder 11 raises an in-cylinder temperature.

The injector 6 injects fuel into the cylinder 11 during a period of intake stroke. The injected fuel spreads by an intake air flow, and forms a homogeneous mixture gas inside the cylinder 11. As illustrated in the figure, the injector 6 may perform a package or batch injection. The injector 6 may perform a divided injection. In the HCCI combustion, the mixture gas in which an air-fuel ratio (A/F) is leaner than the stoichiometric air-fuel ratio and a gas-fuel ratio (G/F) is leaner than the stoichiometric air-fuel ratio is formed inside the cylinder 11.

When the operating state of the engine 1 is within the low-load low-and-middle-speed range 421, neither of the first spark plug 251 and the second spark plug 252 performs ignition. The mixture gas inside the cylinder 11 carries out the compression ignition near a compression top dead center (TDC). Since the load of the engine 1 is low and the fuel amount is small, the compression ignition combustion (more accurately, the HCCI combustion) is realized by making the fuel leaner, while suppressing abnormal combustion. Further, by introducing a large amount of internal EGR gas to raise the in-cylinder temperature, stability of the HCCI combustion improves and thermal efficiency of the engine 1 also improves.

(MPCI Combustion)

When the operating state of the engine 1 is within the second range of the second base map 402 (i.e., the middle-load low-and-middle-speed range 422), the ECU 10 carries out the compression ignition combustion of the mixture gas inside the cylinder 11. In more detail, the exhaust S-VT 241 sets the opening-and-closing timing of the exhaust valve 22 at a given timing. The exhaust VVL 242 opens and closes the exhaust valve 22 twice. The internal EGR gas is introduced into the cylinder 11. The intake CVVL 232 sets the lift of the intake valve 21 larger than the lift in the low-load low-and-middle-speed range 421. The close timing of the intake valve 21 is almost the same as the close timing in the low-load low-and-middle-speed range 421. The open timing of the intake valve 21 is advanced from the open timing in the low-load low-and-middle-speed range 421. According to the opening-and-closing mode of the intake valve 21 and the exhaust valve 22, an amount of air introduced into the cylinder 11 increases, and an introducing amount of the burnt gas decrease as compared with the low-load low-and-middle-speed range 421.

The injector 6 injects fuel into the cylinder 11 during the period of compression stroke and during the period of intake stroke. The injector 6 performs the divided injection. Also in the MPCI combustion, the mixture gas in which the A/F is leaner than the stoichiometric air-fuel ratio and the G/F is leaner than the stoichiometric air-fuel ratio is formed inside the cylinder 11.

In the middle-load low-and-middle-speed range 422, the ECU 10 selectively uses two injection modes of a squish injection and a trigger injection. The squish injection is an injection mode in which the injector 6 injects fuel during the period of intake stroke and in a middle period of compression stroke. The trigger injection is an injection mode in which the injector 6 injects fuel during the period of intake stroke and in a later period of compression stroke. Note that, here, the compression stroke is equally divided into three comprised of an early period, the middle period, and the later period.

The squish injection is an injection mode in which the compression ignition combustion is made slower. The fuel injected during the period of intake stroke spreads inside the cylinder 11 by an intake air flow. The homogeneous mixture gas is formed inside the cylinder 11. As illustrated in the lower figure of FIG. 2, the fuel injected in the middle period of compression stroke reaches a squish area 171 outside the cavity 31. Since the squish area 171 is close to a cylinder liner, it is a range where the temperature is originally low, and the temperature further decreases due to latent heat caused when the fuel spray evaporates. The temperature inside the cylinder 11 decreases locally, and the fuel becomes heterogeneous inside the entire cylinder 11. As a result, for example, when the in-cylinder temperature is high, the mixture gas carries out the compression ignition at a desired timing, while suppressing generation of abnormal combustion. The squish injection enables the compression ignition combustion which is comparatively slow.

In the squish injection, the injection amount of fuel in compression stroke is larger than the injection amount of fuel in intake stroke. Since the fuel is injected in a large range outside the cavity 31, generation of smoke can be suppressed, even if the amount of fuel is large. The temperature decreases as the amount of fuel increases. The injection amount of fuel in compression stroke may be set as an amount at which the demanded temperature decrease can be realized.

Figure 7:
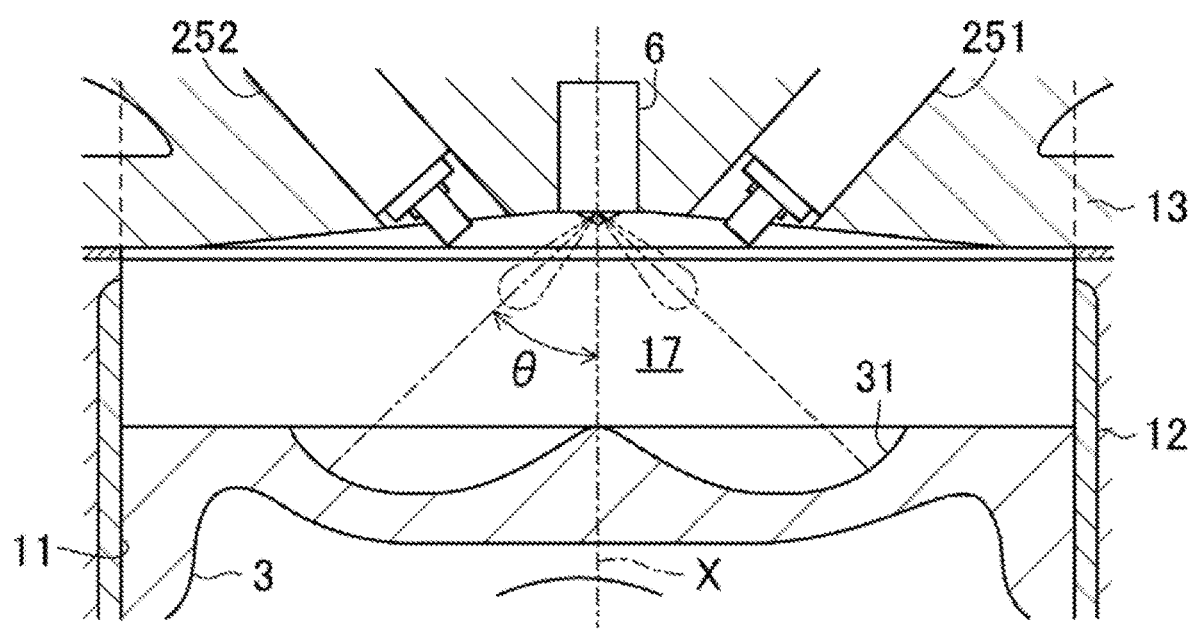
FIG. 7 is a view illustrating a state where fuel is injected into a cylinder in a later period of compression stroke.

The trigger injection is an injection mode which promotes the compression ignition combustion. The fuel injected during the period of intake stroke spreads inside the cylinder 11 by an intake air flow. The homogeneous mixture gas is formed inside the cylinder 11. As illustrated in FIG. 7, since the fuel injected in the later period of compression stroke is difficult to spread due to a high pressure inside the cylinder 11, it stays at an area in the cavity 31. Note that the area in the cavity 31 means an area inward in the radial direction of the cylinder 11 from the outer circumferential edge of the cavity 31. The inside of the cavity 31 which is dented from the top surface of the piston 3 is also included in the area in the cavity 31. The fuel inside the cylinder 11 is heterogeneous. Further, since the center part of the cylinder 11 is distant from the cylinder liner, it is an area where the temperature is high. Since a fuel-rich mixture gas mass is formed in the high-temperature area, the compression ignition of the mixture gas is promoted. As a result, the mixture gas promptly carries out the compression ignition after the compression-stroke injection to promote the compression ignition combustion. The trigger injection increases the combustion stability.

Both the squish injection and the trigger injection make the mixture gas inside the cylinder 11 heterogeneous. In this regard, it differs from the HCCI combustion in which the homogeneous mixture gas is formed. Both the squish injection and the trigger injection can control the timing of the compression ignition by forming the heterogeneous mixture gas.

Since in this combustion mode the injector 6 performs a plurality of fuel injections, this combustion mode may be referred to as MPCI (Multiple Premixed fuel injection Compression Ignition) combustion.

(SPCCI Combustion)

When the operating state of the engine 1 is within the second range of the first base map 401 (in more detail, within the middle-load middle-speed range 412), the ECU 10 causes part of the mixture gas inside the cylinder 11 to carry out the flame propagation combustion, and causes the remaining mixture gas to carry out the compression ignition combustion. In more detail, the exhaust S-VT 241 sets the opening-and-closing timing of the exhaust valve 22 at a given timing. The exhaust VVL 242 opens and closes the exhaust valve 22 twice. The internal EGR gas is introduced into the cylinder 11. The intake CVVL 232 sets the lift of the intake valve 21 larger than the lift of the low-load low-and-middle-speed range 421. The close timing of the intake valve 21 is almost the same as the close timing of the low-load range 415. The open timing of the intake valve 21 is advanced from the open timing of the low-load low-and-middle-speed range 421. According to the opening-and-closing mode of the intake valve 21 and the exhaust valve 22, the amount of air introduced into the cylinder 11 increases, and the introducing amount of the burnt gas decreases.

The injector 6 injects fuel into the cylinder 11 during the period of intake stroke and the period of compression stroke. The injector 6 performs the divided injection. Note that when the operating state of the engine 1 is, for example, at the high load in the middle-load middle-speed range 412, the injector 6 may inject fuel only during the period of compression stroke. The late injection of fuel is advantageous for suppressing abnormal combustion. The mixture gas in which the A/F is the stoichiometric air-fuel ratio and the G/F is leaner than the stoichiometric air-fuel ratio is formed inside the cylinder 11.

Both the first spark plug 251 and/or the second spark plug 252 ignite the mixture gas near a compression top dead center. The mixture gas starts the flame propagation combustion near the compression top dead center after the ignition by the first spark plug 251 and/or the second spark plug 252. The temperature inside the cylinder 11 increases due to generation of heat by the flame propagation combustion, and the pressure inside the cylinder 11 increases by the flame propagation. Thus, unburnt mixture gas carries out self-ignition, for example, after the compression top dead center, and starts the compression ignition combustion. After the compression ignition combustion is started, the flame propagation combustion and the compression ignition combustion progress in parallel. The waveform of the rate of heat release may have two peaks as illustrated in FIG. 6.

By adjusting the calorific value of the flame propagation combustion, the variation in the temperature inside the cylinder 11 before the compression starts can be absorbed. As the ECU 10 adjusts the ignition timing, it can adjust the calorific value of the flame propagation combustion. The mixture gas comes to carry out the self-ignition at a target timing. In the SPCCI combustion, the ECU 10 adjusts the timing of the compression ignition through the adjustment of the ignition timing. In the SPCCI combustion mode, the ignition controls the compression ignition.

(First SI Combustion)

When the operating state of the engine 1 is within the first range of the first base map 401 (i.e., within the low-and-middle-load range 411), the ECU 10 carries out the flame propagation combustion of the mixture gas inside the cylinder 11. In more detail, the intake S-VT 231 sets the opening-and-closing timing of the intake valve 21 at a given timing. The intake CVVL 232 sets the lift of the intake valve 21 to a given lift. The lift of the intake valve 21 is substantially the same as the lift of the exhaust valve 22 which will be described later. The exhaust S-VT 241 sets the opening-and-closing timing of the exhaust valve 22 at a given timing. Both the intake valve 21 and the exhaust valve 22 open near an intake top dead center. The exhaust VVL 242 opens and closes the exhaust valve 22 only once. According to the opening-and-closing mode of the intake valve 21 and the exhaust valve 22, air and burnt gas are introduced into the cylinder 11. Fundamentally, the burnt gas is internal EGR gas which remains inside the cylinder 11.

The injector 6 injects fuel into the cylinder 11 during the period of intake stroke. The injector 6 may perform a package or batch injection, as illustrated in the figure. The fuel injected into the cylinder 11 spreads by an intake air flow. The mass ratio A/F of air to fuel inside the cylinder 11 is the stoichiometric air-fuel ratio. On the other hand, the G/F of the mixture gas is leaner than the stoichiometric air-fuel ratio.

Both the first spark plug 251 and the second spark plug 252 ignite the mixture gas near a compression top dead center. The first spark plug 251 and the second spark plug 252 may ignite simultaneously or may ignite at different timings.

The mixture gas carries out the flame propagation combustion after the ignition of the first spark plug 251 and the second spark plug 252. Thus, the engine 1 can operate, while securing the combustion stability and suppressing misfire.

(Second SI Combustion)

When the operating state of the engine 1 is within the third range of the first base map 401 (i.e., within the high-load range 413), the ECU 10 carries out the flame propagation combustion of the mixture gas inside the cylinder 11. In more detail, when the operating state of the engine 1 is within high-load range 413, the intake S-VT 231 sets the opening-and-closing timing of the intake valve 21 at a given timing. The intake CVVL 232 sets the lift of the intake valve 21 to a given lift. The lift of the intake valve 21 is substantially the same as the lift of the exhaust valve 22 which will be described later. The exhaust S-VT 241 sets the opening-and-closing timing of the exhaust valve 22 at a given timing. Both the intake valve 21 and the exhaust valve 22 open near an intake top dead center. The exhaust VVL 242 opens and closes the exhaust valve 22 only once. According to the opening-and-closing mode of the intake valve 21 and the exhaust valve 22, a comparatively large amount of air and a comparatively small amount of burnt gas are introduced into the cylinder 11. Fundamentally, the burnt gas is internal EGR gas which remains inside the cylinder 11.

Since the high-load range 413 is a range where the load is high, abnormal combustion, such as pre-ignition or knock tends to occur. The injector 6 injects fuel into the cylinder 11 during the period of compression stroke. Generation of abnormal combustion is suppressed by retarding the timing at which fuel is injected into the cylinder 11 to immediately before ignition. The injector 6 may perform a package or batch injection, as illustrated in the figure. The mixture gas in which the A/F is the stoichiometric air-fuel ratio and the G/F is leaner than the stoichiometric air-fuel ratio is formed inside the cylinder 11.

The fuel injected into the cylinder 11 during the period of compression stroke spreads by a flow of this injection. The injection pressure of fuel is preferably high for suppressing the generation of abnormal combustion and improving the combustion stability by allowing the mixture gas to combust rapidly. The high injection pressure generates a strong flow inside the cylinder 11 where the pressure is high near a compression top dead center. The strong flow promotes the flame propagation.

Both the first spark plug 251 and the second spark plug 252 ignite the mixture gas near a compression top dead center. The first spark plug 251 and the second spark plug 252 may ignite simultaneously, or may ignite at different timings. In the high-load range 413 where the load is high, the first spark plug 251 and the second spark plug 252 ignite at a timing after the compression top dead center, corresponding to the retard injection timing of the fuel. After the ignition of the first spark plug 251 and the second spark plug 252, the mixture gas carries out the flame propagation combustion. Two-point ignition realizes the rapid combustion. In the operating state at the high load where abnormal combustion tends to occur, the engine 1 can operate while securing the combustion stability and suppressing abnormal combustion.

(Engine Combustion Control)

As described above, since the HCCI combustion and the MPCI combustion are compression ignition combustion, the combustion is greatly influenced by the in-cylinder properties. Therefore, when the in-cylinder properties change greatly in connection with the switching between the flame propagation combustion and the compressed self-ignition combustion, such as in the transition state, as illustrated in FIG. 5, the target in-cylinder properties (the in-cylinder temperature, the EGR rate, etc.) are not formed appropriately, and therefore, the combustion stability may decrease. Particularly, since devices of the intake system and the exhaust system are comparatively large in the response delay, this response delay may cause that the target in-cylinder properties are not satisfied. Thus, in this embodiment, the injector 6, the spark plugs 251 and 252, the intake-side valve operating mechanism (the intake S-VT 231, the intake CVVL 232), and the exhaust-side valve operating mechanism (the exhaust S-VT 241, the exhaust VVL 242) are controlled so that the target torque which is set based on the accelerator opening detected by the accelerator opening sensor SW7 is realized after lapse of a given period.

Figure 15:
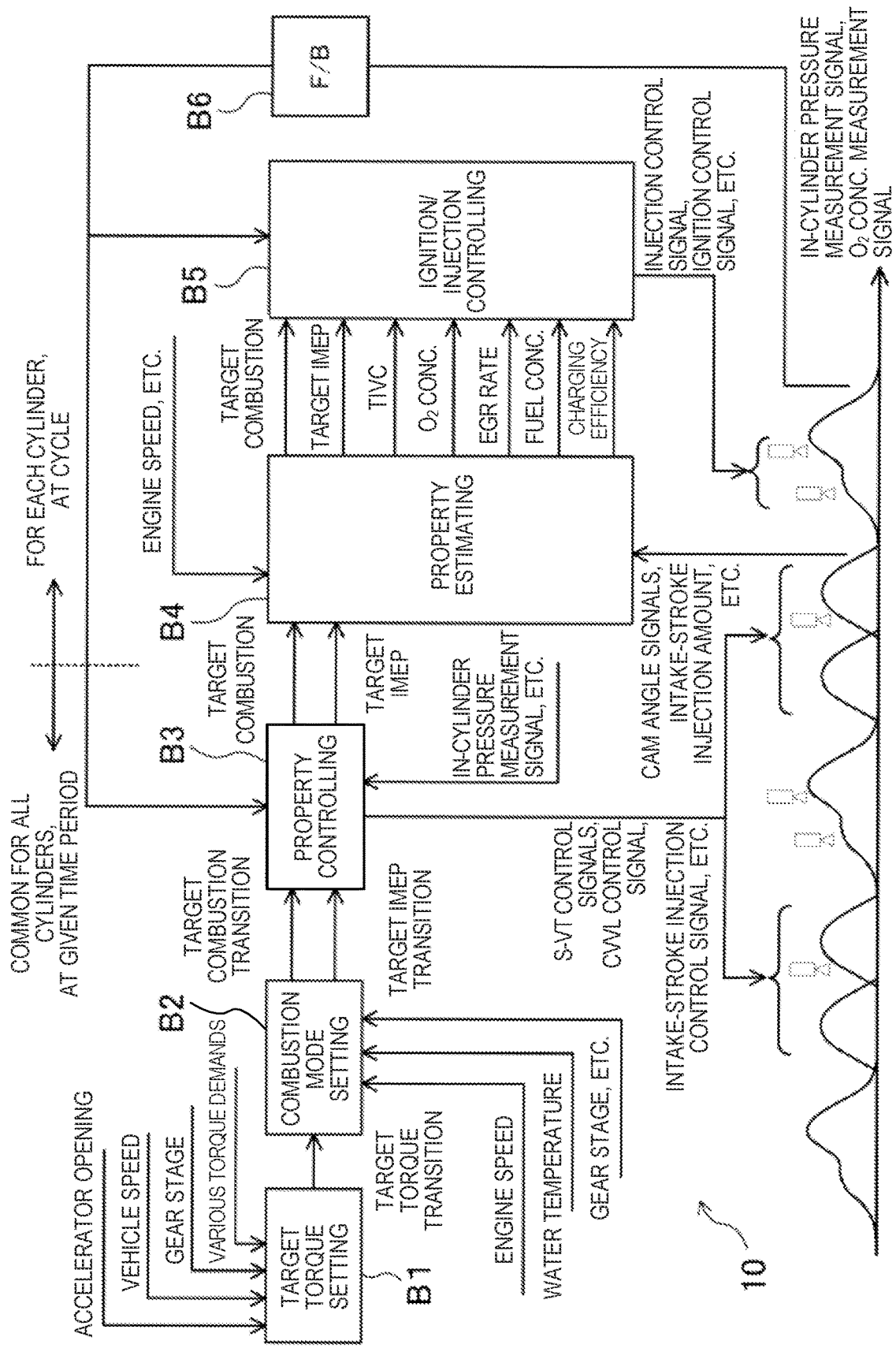
FIG. 15 is a view illustrating a functional block of the ECU.

FIG. 15 illustrates a functional block of the ECU 10 according to the control of the engine 1. The ECU 10 includes a target torque setting block B1, a combustion mode setting block B2, a property controlling block B3, a property estimating block B4, an ignition/injection controlling block B5, and a feedback block B6.

The target torque setting block B1 is a block for setting the target torque of the engine 1 based on the driver's accelerator operation. At least a signal according to the accelerator opening, a signal according to the vehicle speed, a signal according to the gear stage, and various kinds of signals according to the torque demand of the engine 1 (e.g., ON signal of a compressor for air-conditioning) are inputted into the target torque setting block B1. As will be described in detail later, the target torque setting block B1 sets the target torque in the future by the given delay time, based on the current accelerator operation by the driver. Therefore, the target torque setting block B1 updates each time the transition of the target torque from the present time to the given future, with progress of time.

The combustion mode setting block B2 selects the combustion mode in the future cycle based on the set target torque, and sets a target IMEP according to the selected combustion mode of each cycle. At least a signal according to the engine speed, a signal according to the water temperature, and a signal according to the gear stage are inputted into the combustion mode setting block B2. These signals are mainly utilized for the selection of the combustion mode. As described above, since the transition of the target torque from the present time to the given future is set, the combustion mode setting block B2 sets the transition of the combustion mode and the transition of the target IMEP from the present time to the given future.

The property controlling block B3 adjusts the properties of each cylinder 11 based on the set transition of the combustion mode and the transition of the target IMEP. At least, a signal according to the in-cylinder pressure measured by the in-cylinder pressure sensor SW4, a signal according to the vehicle speed, and a signal according to the gear stage are inputted into the property controlling block B3. The property controlling block B3 determines the properties inside the cylinder 11 where the target IMEP is realized, based on the transition of the target IMEP, and determines the controlled variables of the property adjusting device so that the properties are realized. The property adjusting device includes at least the intake S-VT 231, the intake CVVL 232, the exhaust S-VT 241, the exhaust VVL 242, the throttle valve 43, and the EGR valve 54. The property controlling block B3 outputs the control signal beforehand to the property adjusting device in consideration of that it takes time for adjusting the properties. As described above, since the transition of the target torque from the present time to the given future is set, the ECU 10 can output the control signal beforehand by utilizing the delay time.

Here, the control of the target torque setting block B1, the combustion mode setting block B2, and the property controlling block B3 is performed commonly for all the cylinders 11 of the engine 1, and at a given time period. It is because the driver's accelerator operation is based on time, and because the intake S-VT 231, the intake CVVL 232, the exhaust S-VT 241, and the exhaust VVL 242 cannot be controlled for each cylinder 11 and they are common devices for all the cylinders 11.

The property estimating block B4 and the ignition/injection controlling block B5 perform the control at the timing when the above-described given delay time passes. The property estimating block B4 and the ignition/injection controlling block B5 perform the control at the cycle (i.e., a cycle comprised of intake stroke, compression stroke, expansion stroke, and exhaust stroke), for each cylinder 11.

The property estimating block B4 estimates the properties inside the cylinder 11 at the timing of closing the intake valve 21 of the cylinder 11. The measurement signals of the intake cam angle sensor SW8, the exhaust cam angle sensor SW9, and the intake cam lift sensor SW10, and, when fuel is injected in intake stroke, a signal according to the fuel injection amount are inputted into the property estimating block B4. Further, at least a signal according to the engine speed is inputted into the property estimating block B4. The property estimating block B4 estimates the properties inside the cylinder 11 based on these signals. In detail, for example, the property estimating block B4 estimates a temperature Trvc inside the cylinder 11, an oxygen concentration inside the cylinder 11, an EGR rate, a fuel concentration, and a charging efficiency, at a close timing of the intake valve 21.

By the property estimating block B4 estimating the properties, the ECU 10 can determine whether the target IMEP and the combustion mode set beforehand by the combustion mode setting block B2 correspond to the actual properties of the cylinder 11. If they correspond to the actual properties, the target IMEP is achieved by combustion occurring inside the cylinder 11. If they do not correspond to the actual properties, the target IMEP may not be achieved as it is.

After the properties are estimated, the ignition/injection controlling block B5 outputs an injection control signal to the injector 6 and outputs an ignition control signal to the first spark plug 251 and/or the second spark plug 252. The ignition/injection controlling block B5 estimates combustion inside the cylinder 11 based on the properties estimated by the property estimating block B4, and determines a deviation of the estimated combustion from the target combustion. If there is no deviation between the estimated combustion and the target combustion, the ignition/injection controlling block B5 causes the injector 6 to inject a preset amount of fuel into the cylinder 11 at a preset timing, and causes the first spark plug 251 and/or the second spark plug 252 to ignite at a preset timing. If there is a deviation between the estimated combustion and the target combustion, the ignition/injection controlling block B5 adjusts the injection timing and/or the injection amount of fuel, and adjusts the ignition timing (see two-direction arrows in FIG. 6). Thus, even if the target IMEP and the combustion mode do not correspond to the actual properties of the cylinder 11, the ignition timing of the mixture gas (including both forcible ignition and compressed self-ignition) becomes a suitable timing, and the target IMEP can be achieved.

A signal according to the in-cylinder pressure measured by the in-cylinder pressure sensor SW4, and a signal according to the oxygen concentration in the exhaust gas measured by the linear $O_2$ sensor SW11 are inputted into the feedback block B6. The feedback block B6 determines the combustion inside the cylinder 11 based on these measurement signals, and determines a deviation of the actual combustion from the planned combustion. If there is a deviation, the feedback block B6 outputs a feedback signal to the controlling blocks. In detail, the controlling blocks are the property controlling block B3 and the ignition/injection controlling block B5. The property controlling block B3 and the ignition/injection controlling block B5, which received the feedback signals, correct the control signal so that the deviation is eliminated.

Below, the combustion control performed by the ECU 10 is described in further detail with reference to each flowchart.

Figure 8:
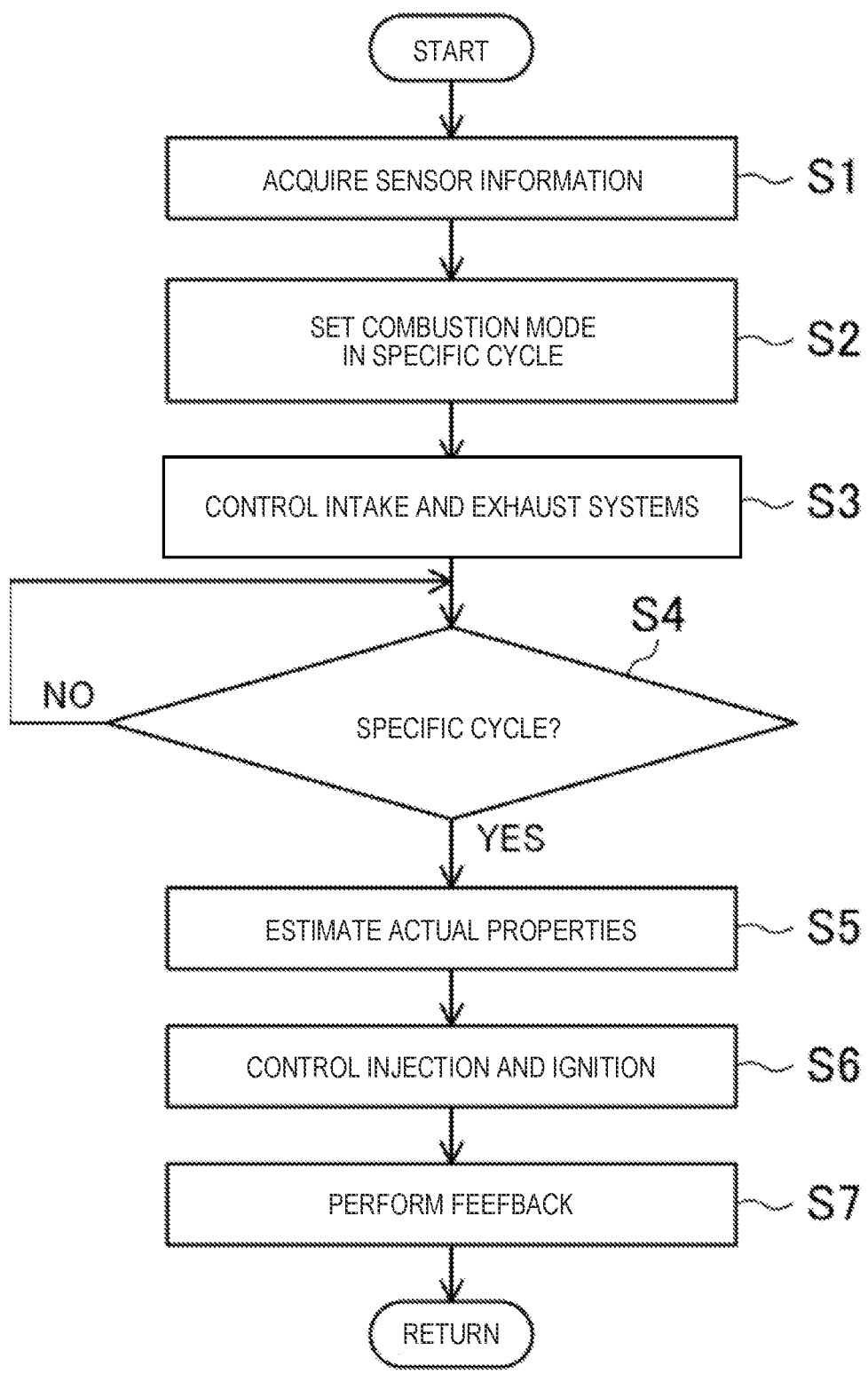
FIG. 8 is a flowchart illustrating a processing operation of an Engine Control Unit (ECU) in a combustion control of the engine.

FIG. 8 is a flowchart of the combustion control performed by the ECU 10.

First, at Step S1, the ECU 10 acquires various sensor information.

Next, at Step S2, the ECU 10 sets a target torque in a specific cycle after lapse of a given period from the present cycle, and sets the target IMEP and the combustion mode corresponding to the target torque. The ECU 10 sets the combustion mode for every cylinder 11. The detailed contents of Step S2 will be described later.

Next, at Step S3, the ECU 10 sets in-cylinder properties which satisfy the target IMEP by combustion in the set combustion mode, and controls the intake valve operating mechanism (the intake S-VT 231, the intake CVVL 232) and the exhaust valve operating mechanism (the exhaust S-VT 241, the exhaust VVL 242) so that the in-cylinder properties in the specific cycle become the set in-cylinder properties. Further, when the set combustion mode is a combustion mode in which intake-stroke injection is performed, the ECU 10 controls the injector 6. Further, the ECU 10 controls the throttle valve 43 and the EGR valve 54 so that the in-cylinder properties in the specific cycle become the set in-cylinder properties. The detailed contents of Step S3 will be described later.

Next, at Step S4, the ECU 10 determines whether the cycle reaches the specific cycle. If YES where the cycle reaches the specific cycle, the ECU 10 shifts to Step S5. On the other hand, if NO where the cycle is before the specific cycle, the ECU 10 repeats the determination of Step S4 until the specific cycle.

At Step S5, the ECU 10 estimates the in-cylinder properties inside the cylinder 11 when closing the intake valve 21 in the specific cycle. The detailed contents of Step S5 will be described later.

Next, at Step S6, the ECU 10 controls at least one of the fuel injection by the injector 6 and the ignition by the spark plugs 251 and 252. If the combustion mode is the HCCI combustion or the MPCI combustion, the ECU 10 only performs the control of the injector 6, without controlling the spark plugs 251 and 252. If the combustion mode is the SPCCI combustion, the first SI combustion, or the second SI combustion, the ECU 10 performs both the control of the injector 6 and the control of the spark plugs 251 and 252. The detailed contents of Step S6 will be described later.

Next, the ECU 10 feeds back at Step S7. Particularly, the ECU 10 performs the feedback to the control of the intake valve operating mechanism, the exhaust valve operating mechanism, the first spark plug 251, the second spark plug 252, and the injector 6 based on a difference between the planned combustion and the actual combustion.

After Step S7, the process returns.

(Setting of Combustion Mode)

Figure 9:
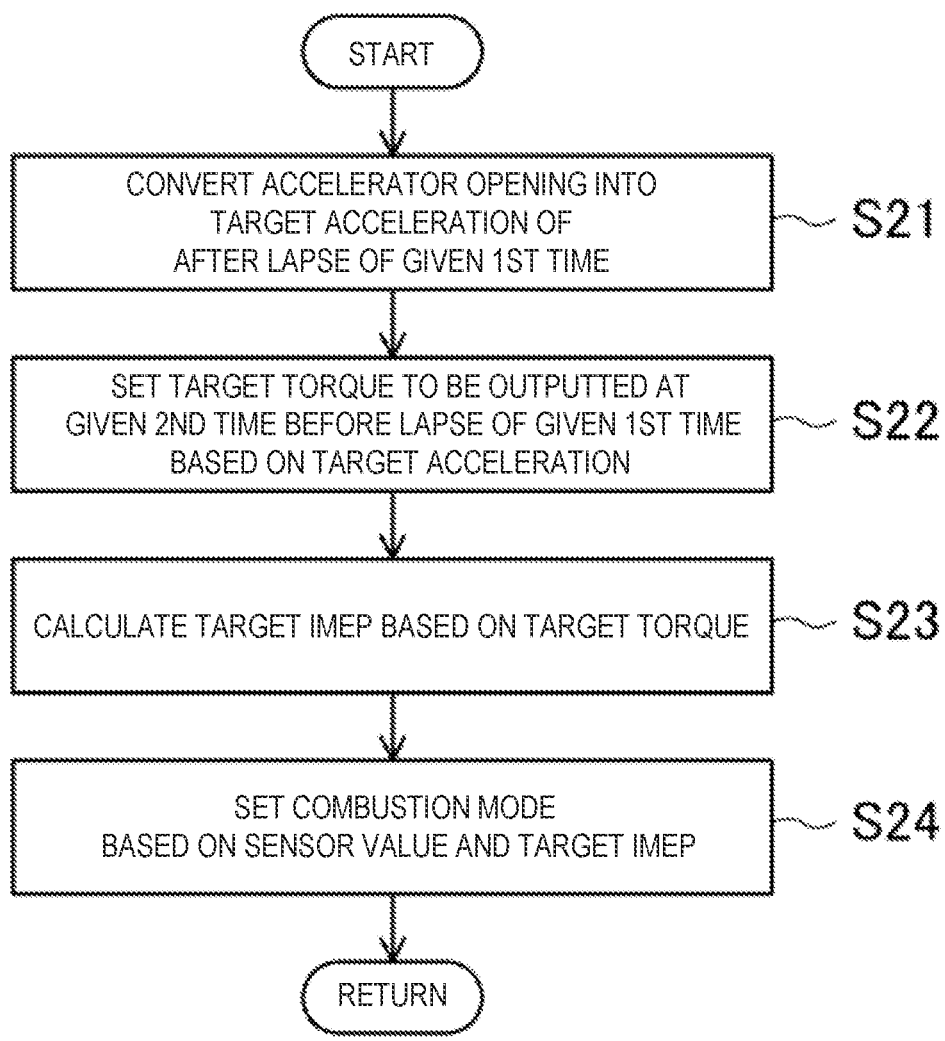
FIG. 9 is a flowchart illustrating a processing operation of the ECU when setting the combustion mode.

FIG. 9 is a flowchart illustrating a processing operation of the ECU 10 when setting the combustion mode (i.e., above-described Step S2).

First, at Step S21, the ECU 10 converts the detection result of the accelerator opening sensor SW7 into a target acceleration of the vehicle to be realized after lapse of a given first time.

Next, at Step S22, the ECU 10 sets a target torque based on the target acceleration.

Next, at Step S23, the ECU 10 sets a target IMEP based on the target torque.

Next, at Step S24, the ECU 10 sets a combustion mode based on the sensor value, such as the water temperature, and the target IMEP.

After Step S24, the process returns and shifts to Step S3.

Figure 10:
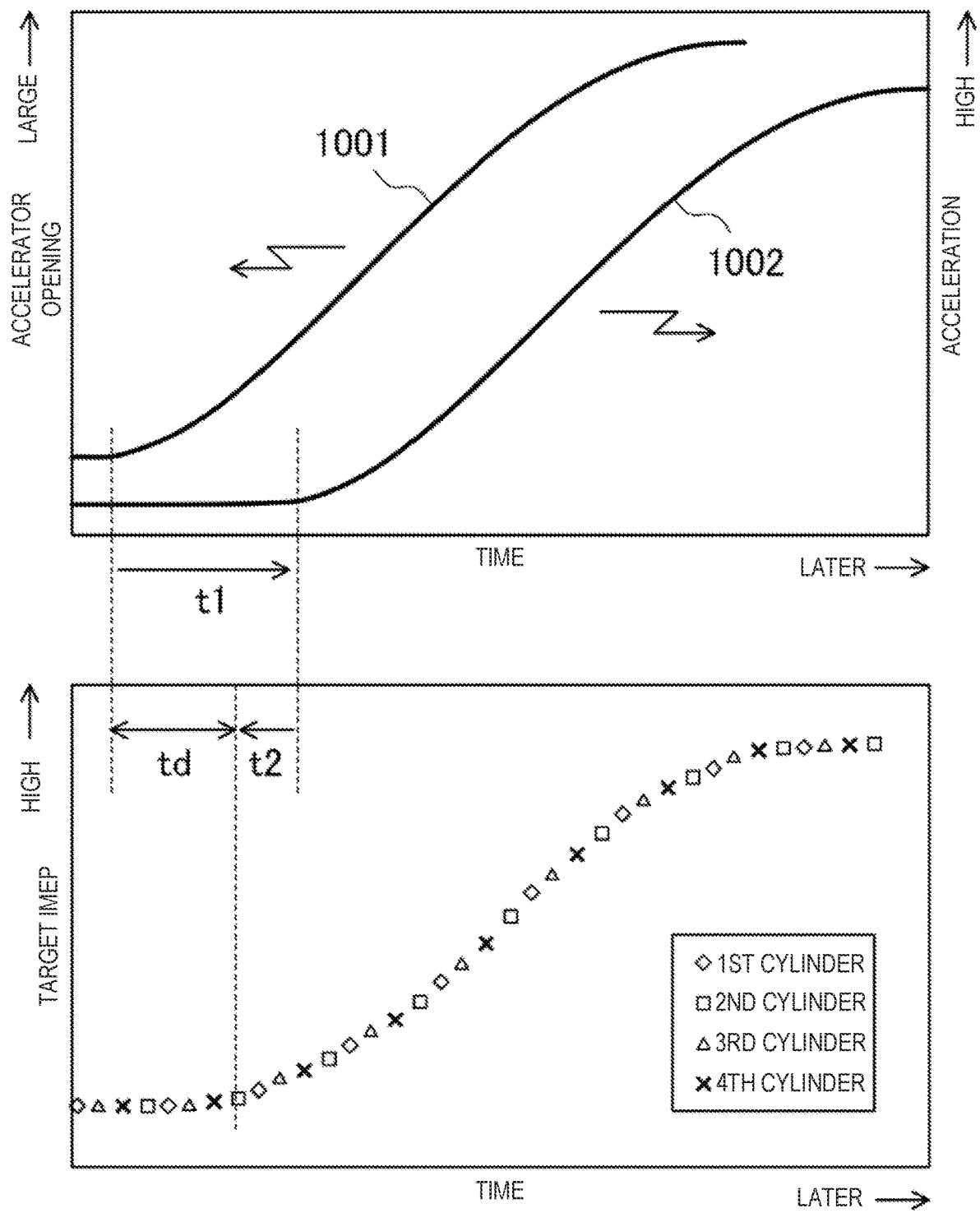
FIG. 10 is a view of an accelerator operation, where the upper figure is a graph illustrating a relationship between an accelerator opening and an acceleration accompanying the accelerator operation, and the lower figure is a graph illustrating a target Indicated Mean Effective Pressure (IMEP) accompanying the accelerator operation.

FIG. 10 illustrates a concept for setting the target IMEP based on the result of the accelerator opening sensor SW7. In FIG. 10, the horizontal axis is time, and the time axis is the same for the upper figure and the lower figure.

As illustrated in FIG. 10, when the accelerator pedal is depressed, the accelerator opening increases (see 1001). At this time, the ECU 10 calculates an acceleration of the vehicle to be realized after lapse of a given first time t1 (see 1002).

This given first time t1 is set as a period of time which is sufficient for the driver preparing for the posture of a vehicle acceleration after stepping on the accelerator pedal. The given first time t1 is 200 milliseconds, for example. The drivability improves by delaying the response of the vehicle behavior to the accelerator operation.

Next, in order to realize the calculated acceleration, the ECU 10 calculates a target torque of the engine 1 to be outputted at a given second time t2 before the lapse of the given first time t1, and converts it into the target IMEP. The given second time t2 is equivalent to a period of time until the power outputted from the engine 1 is transmitted to the driving wheels via the transmission, the differential gear, the drive shaft, etc. The given second time t2 is 50 milliseconds, for example.

A difference between the given first time t1 and the given second time t2 (here, 150 milliseconds) corresponds to the given delay time td. Therefore, the target IMEP to be realized in the specific cycle after the lapse of the given delay time td from the present time is set. Since a change in the accelerator opening is continuous over time, and the target IMEP is set corresponding to the frequently-changing accelerator opening, a target IMEP path indicative of a time change in the target IMEP is calculated. Then, based on the target IMEP path, and the temperature of the coolant, the gear stage, etc., the combustion mode in the specific cycle is set according to the base maps 401 and 402 of FIG. 4. Note that the specific cycle is each cycle after lapse of a given period from the present cycle of each cylinder 11. That is, the specific cycle exists for each cylinder 11.

The ECU 10 determines which base map of the first base map 401 and the second base map 402 is to be adopted according to the target IMEP, the temperature of the coolant, the gear stage, etc. The first base map 401 is fundamentally adopted, and when all given conditions are satisfied, the ECU 10 gives priority to the second base map 402 when adopting the base map. The given conditions are, for example, (1) the engine is warm where the temperature of the coolant is above a given temperature, (2) the gear stage is higher than a give stage, (3) a slope of the target IMEP is less than a given slope (see FIG. 5 or the lower figure of FIG. 10).

As the temperature of the coolant and the gear stage which are utilized when setting the combustion mode, a temperature of the coolant and a gear stage which are detected at the present time are adopted. As illustrated, since the given delay time td is less than 1 second, the temperature of the coolant and the gear stage do not fundamentally change by the time when the delay time td passes. Therefore, when setting the combustion mode in the specific cycle, it will not become a problem even if the temperature of the coolant and the gear stage which are detected at the present time are utilized.

Further, the range of the second base map 402 for performing the compressed self-ignition combustion is comparatively narrow, and when the slope of the target IMEP is more than a given slope, the combustion mode of the engine 1 is switched from the flame propagation combustion to the compressed self-ignition combustion, and immediately after that, it is switched back from the compressed self-ignition combustion to the flame propagation combustion. That is, the duration of the compressed self-ignition combustion is comparatively short. The compressed self-ignition combustion contributes to the improvement in the fuel efficiency of the engine 1 by being carried out continuously for a long period of time to some extent. Therefore, when the slope of the target IMEP is more than the given slope, the compressed self-ignition combustion is avoided by not adopting the second base map 402. When the slope of the target IMEP is less than the given slope, the compressed self-ignition combustion is performed by adopting the second base map 402, because the improvement in the fuel efficiency can be expected.

Thus, as illustrated in the lower figure of FIG. 10, the ECU 10 assigns each cylinder 11 to the target IMEP path, and sets the combustion mode of each cylinder 11. Since the ECU 10 sets the combustion mode for every cycle, the combustion mode is set for every cylinder 11. Since in this embodiment combustion takes place in the order of the first cylinder, the third cylinder, the fourth cylinder, and the second cylinder, as described above, the ECU 10 sets the combustion mode of each cylinder 11 after setting the combustion order as the above-described order. Therefore, the combustion transition from the present cycle to the specific cycle is set beforehand.

(Control of Intake System and Exhaust System)

Figure 11:
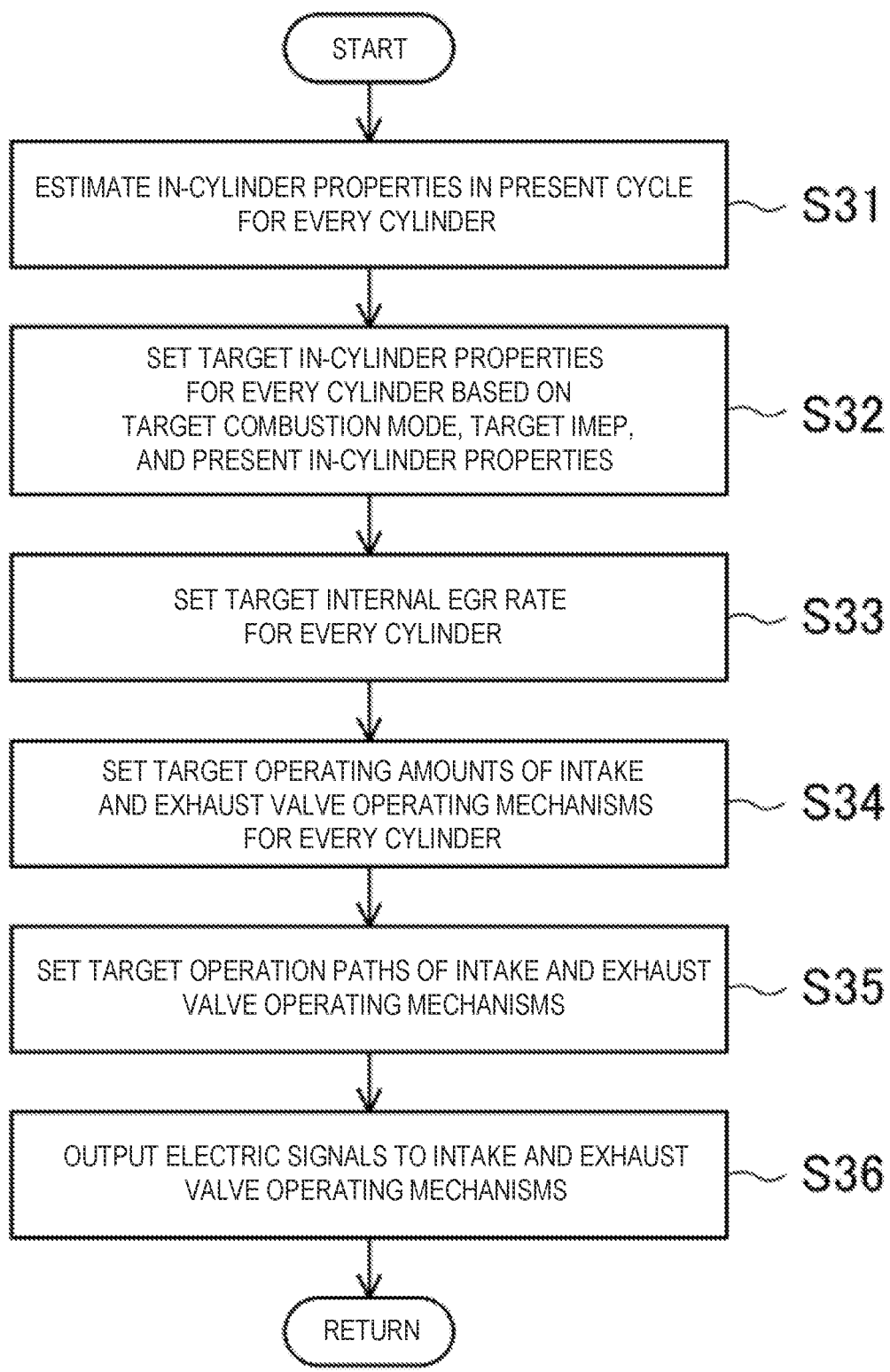
FIG. 11 is a flowchart illustrating a processing operation of the ECU related to a control of an intake system and an exhaust system.

FIG. 11 is a flowchart illustrating a processing operation of the ECU 10 when controlling the intake valve operating mechanism and the exhaust valve operating mechanism (i.e., above-described Step S3).

First, at Step S31, the ECU 10 estimates the in-cylinder properties in the present cycle. The ECU 10 estimates the in-cylinder properties when the intake valve 21 is closed. The in-cylinder properties are properties related to the ignition timing of the CI combustion, such as the in-cylinder pressure, the in-cylinder temperature, the oxygen concentration, etc. The ECU 10 estimates the internal EGR rate by using a model based on the actual operation of the cam shafts. The ECU 10 estimates the in-cylinder temperature and oxygen concentration based on the internal EGR rate, the exhaust gas temperature at the cycle immediately before of the same cylinder 11, and the temperature of air. Further, the ECU 10 detects the in-cylinder pressure by the in-cylinder pressure sensor SW4 when the intake valve 21 is closed. The ECU 10 estimates the in-cylinder properties for every cylinder 11.

Next, at Step S32, the ECU 10 calculates the target in-cylinder properties in the specific cycle based on the set target combustion mode, the target IMEP, and the estimated in-cylinder properties of the present cycle, and sets them as the target in-cylinder properties. In more detail, the ECU 10 calculates the target ignition timing based on the target IMEP. Next, the ECU 10 calculates particularly the in-cylinder temperature and the oxygen concentration for every cylinder 11 in order to realize the target ignition timing by the target combustion mode.

Next, at Step S33, the ECU 10 sets the target internal EGR rate for reaching the target in-cylinder properties for every cylinder 11. The ECU 10 calculates a relationship between the internal EGR rate, the in-cylinder properties, and the combustion state (the rate of heat release, etc.) by using a combustion model, and sets the target internal EGR rate at which the target in-cylinder properties and the target ignition timing can be satisfied. The ECU 10 uses a combustion model which is at least different between the SI combustion and the CI combustion. The ECU 10 may use different combustion models for different combustion modes. At this Step S33, the transition of the properties inside the cylinder 11 from the present cycle to the specific cycle (i.e., the transition of the target internal EGR rate) is set.

Next, at Step S34, the ECU 10 sets the target operating amounts of the intake valve operating mechanism and the exhaust valve operating mechanism for every cylinder 11 based on the target internal EGR rate. The intake valve operating mechanism is comprised of the intake S-VT 231 and the intake CVVL 232, and the exhaust valve operating mechanism is comprised of the exhaust S-VT 241 and the exhaust VVL 242. The ECU 10 calculates the relationship between the operations of the intake valve 21 and the exhaust valve 22 and the internal EGR rate, and sets the target operating amounts of the intake valve operating mechanism and the exhaust valve operating mechanism for every cylinder 11, at which the target internal EGR rate can be satisfied.

Next, at Step S35, the ECU 10 sets the target operation paths of the intake valve operating mechanism and the exhaust valve operating mechanism. Since the intake valve operating mechanism and the exhaust valve operating mechanism are to operate the cam shafts, the operations of the intake valve 21 and the exhaust valve 22 of all the cylinders 11 are changed if the intake valve operating mechanism and the exhaust valve operating mechanism are operated. Therefore, a fine control is difficult for the intake valve operating mechanism and the exhaust valve operating mechanism. Therefore, the ECU 10 sets the target operation paths so that the target operating amounts of the intake valve operating mechanism and the exhaust valve operating mechanism are realized for every cylinder 11 as much as possible, and the operations of the intake valve operating mechanism and the exhaust valve operating mechanism become continuous.

Figure 12:
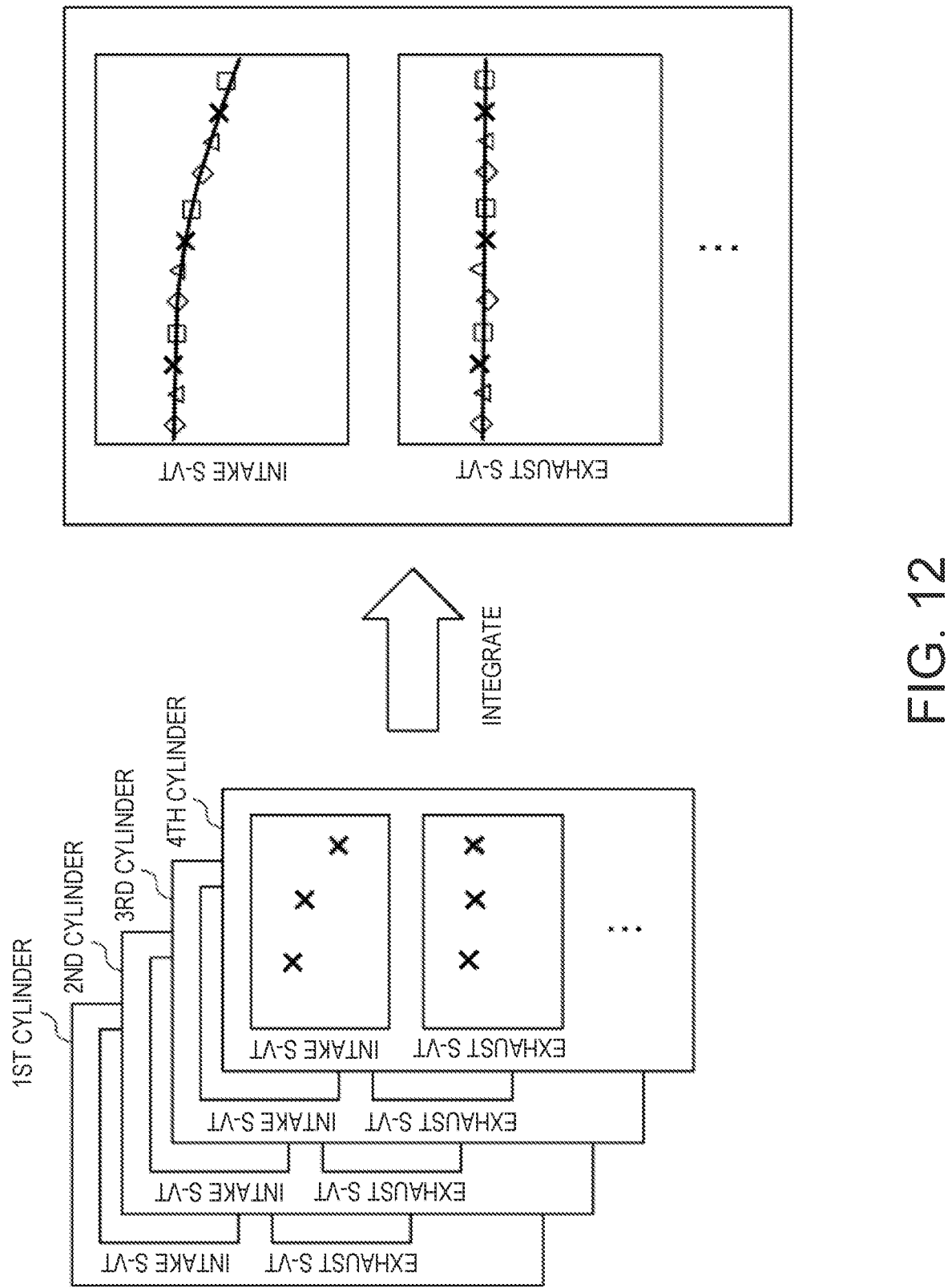
FIG. 12 is a conceptual diagram illustrating settings of target operation paths of an intake S-VT and an exhaust S-VT.

In detail, the settings of the target operation paths are illustrated in FIG. 12. FIG. 12 illustrates a case of the intake S-VT 231 and the exhaust S-VT 241. The ECU 10 puts the target operating amounts of each of the intake valve operating mechanism and the exhaust valve operating mechanism in the time-series order for every cylinder 11. Next, the ECU 10 integrates the target operating amounts into one, and puts the target operating amounts of each of the intake valve operating mechanism and the exhaust valve operating mechanism of all the cylinders 11 in the time-series order. Then, the ECU 10 calculates a continuous path so that each target operating amount can be achieved. The path calculated here becomes the target operation path.

Next, at Step S36, the ECU 10 outputs the electric signals to the intake valve operating mechanism and the exhaust valve operating mechanism at the given timings. The adjustment of the properties includes a response delay of the device which adjusts the properties, and a delay after the device responds until the introducing amount of air or the EGR gas into the cylinder 11 is actually changed. The ECU 10 sets the target in-cylinder properties at the cycle which is future from the present cycle, and sets beforehand the target operating amount for realizing these target in-cylinder properties. Thus, the ECU 10 can output the control signal at the timing in consideration of the delay of the property adjusting device including the intake valve operating mechanism and the exhaust valve operating mechanism.

In more detail, the ECU 10 uses the device model to estimate the operations of the intake valve operating mechanism and the exhaust valve operating mechanism with respect to the electric signal, and generates and outputs the electric signal indicative of such an indicated value that a deviation of the estimated operations from the target operation paths is minimized. After Step S36, the process returns and shifts to Step S4.

Thus, by optimizing the electric signal, the ECU 10 can output the electric signal to each of the intake valve operating mechanism and the exhaust valve operating mechanism in consideration of the deviation between the timing at which the electric signal is outputted to the intake valve operating mechanism or the exhaust valve operating mechanism and the timing at which the intake valve operating mechanism or the exhaust valve operating mechanism actually operates according to this electric signal. In detail, the ECU 10 can output the electric signal to the intake valve operating mechanism or the exhaust valve operating mechanism earlier than the timing at which the intake valve operating mechanism or the exhaust valve operating mechanism is actually operated.

Figure 13A:
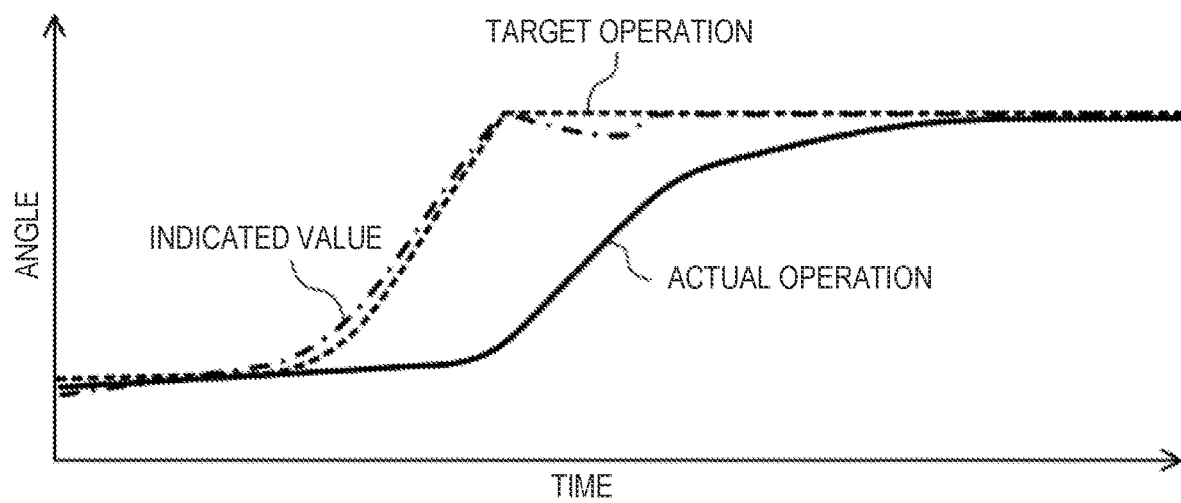
FIGS. 13A and 13B are time charts illustrating a relationship between a target operation, an indicated value, and an actual operation in the control of the intake system and the exhaust system, where
Figure 13B:
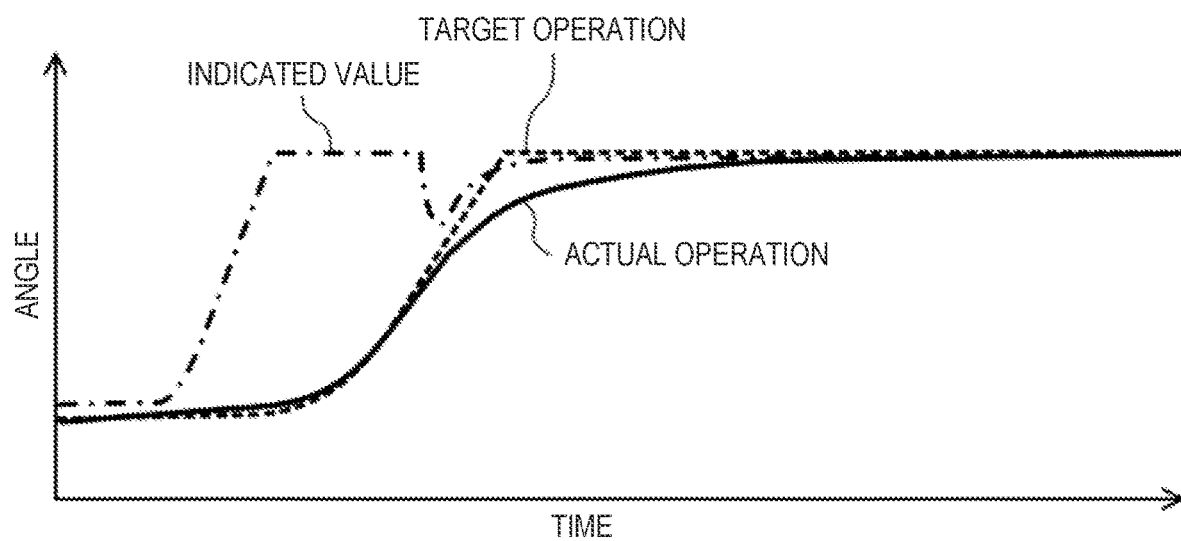

FIGS. 13A and 13B illustrate the timing at which the electric signal indicative of the indicated value is outputted to the intake S-VT 231, the target operation path of the intake S-VT 231, and an actual operation path indicative of the actual operation of the intake S-VT 231. FIG. 13A illustrates a case where the electric signal is outputted at almost the same timing as the target operation path of the intake S-VT 231, like the conventional control. As illustrated in FIG. 13A, in this control, it can be seen that the actual operation path is delayed from the target operation path. This is because the intake S-VT 231 has the delay in the response. On the other hand, in the control of the present disclosure, the electric signal is outputted earlier than the timing of the target operation path. Further, the slope of the controlled variable (i.e., the indicated value) outputted is larger than the slope of the target operation. Therefore, even if the intake S-VT 231 has the response delay, the actual operation path matches substantially with the target operation path. Note that in order to suppress an overshoot of the actual operation, the controlled variable falls temporarily. Thus, since the timing of the target operation path matches substantially with the timing of the actual operation path, the target in-cylinder properties can be formed in the specific cycle with sufficient accuracy.

Note that at the above-described Step S3, the ECU 10 also controls the throttle valve 43 and the EGR valve 54 so that the in-cylinder properties become the target in-cylinder properties in the specific cycle. Since the throttle valve 43 and the EGR valve 54 have high response as compared with the intake valve operating mechanism and the exhaust valve operating mechanism, the electric signals are not necessary to be outputted earlier than the timing at which they actually operate.

(Estimation of In-Cylinder Properties)

When the cycle becomes the specific cycle by progress of time, the ECU 10 estimates the in-cylinder properties when the intake valve 21 is closed in the specific cycle. The ECU 10 estimates the in-cylinder properties based on the sensor values measured in the specific cycle, after the exhaust valve 22 is closed and before the intake valve 21 is closed in the specific cycle (see FIG. 6). The ECU 10 estimates the internal EGR rate based on the actual operations of the cam shafts. The ECU 10 estimates the in-cylinder temperature and the oxygen concentration based on the internal EGR rate, the exhaust gas temperature, and the temperature of fresh air at the cycle immediately before of the same cylinder 11. Further, the ECU 10 detects the in-cylinder pressure by the in-cylinder pressure sensor SW4 when the intake valve 21 is closed. By the estimation of the in-cylinder properties, the ECU 10 can grasp the deviation of the in-cylinder properties in the specific cycle from the target in-cylinder properties set prior to the specific cycle.

(Injection/Ignition Control)

The ECU 10 controls the injection of fuel by the injector 6 and the ignition by the first spark plug 251 and the second spark plug 252 based on the estimated actual in-cylinder properties.

Figure 14:
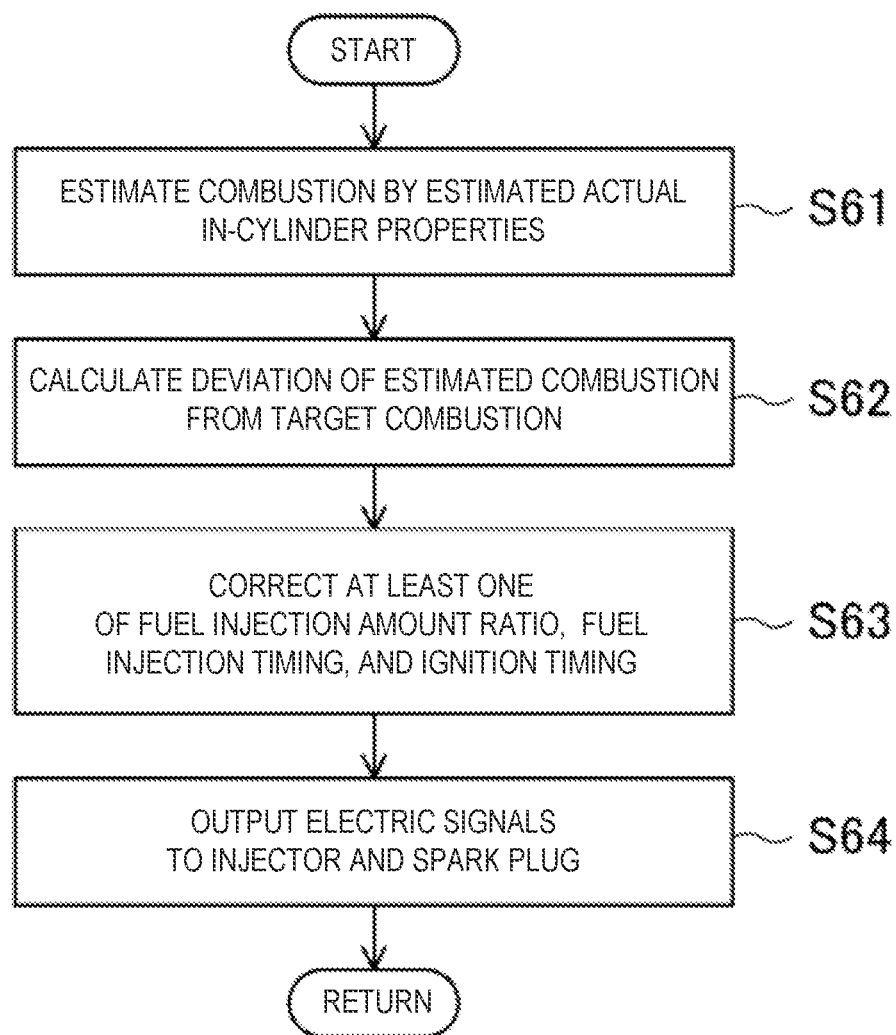
FIG. 14 is a flowchart illustrating a processing operation of the ECU when controlling the injection and the ignition.

FIG. 14 is a flowchart illustrating a processing operation of the ECU 10 when controlling the injection and the ignition (i.e., above-described Step S6).

At Step S61, the ECU 10 estimates the combustion by the combustion model, using the estimated actual in-cylinder properties (the temperature Tivc inside the cylinder 11, the oxygen concentration inside the cylinder 11, the EGR rate, the fuel concentration, the charging efficiency, etc. at the close timing of the intake valve 21) as the parameters. The combustion model used here is the same as the combustion model utilized when setting the target internal EGR rate.

Next, at Step S62, the ECU 10 calculates a deviation of the combustion estimated at Step S61 from the target combustion. The ECU 10 calculates a deviation of a change in the rate of heat release, for example. This deviation of combustion occurs due to the deviation of the actual in-cylinder properties from the target in-cylinder properties, and it can be said that comparing the deviation of combustion is equal to comparing the deviation of the actual in-cylinder properties from the target in-cylinder properties.

Next, at Step S63, the ECU 10 corrects at least one of a ratio of the injection amount of fuel, the injection timing of fuel, and the ignition timing so that the deviation of the combustion state calculated at above-described Step S62 is compensated. These are once set in the stage where the combustion mode is set. Then, at this Step S63, the correction is made and the ratio of the injection amount of fuel, the injection timing of fuel, and the ignition timing become the final values. For example, upon carrying out the SI combustion, when more air than the target amount is introduced, and the combustion is estimated to become steeper than the target slope, the ignitions of the first spark plug 251 and the second spark plug 252 are retarded. Further, upon carrying out the MPCI combustion, when the combustion is estimated to become steeper than the target slope, the combustion is made slower by retarding the injection timing of squish injection in compression stroke, or increasing the ratio of the injection of the squish injection in the compression stroke. Note that the total injection amount of fuel is set as a total injection amount according to the target IMEP and the combustion mode, when the target IMEP and the combustion mode are set.

Since the estimation of the properties is performed before the intake valve 21 is closed, the ECU 10 becomes capable of correcting the injection of fuel after the estimation. As illustrated in FIG. 6, the intake-stroke injection of the HCCI combustion and the intake-stroke injection of the MPCI combustion are performed after the estimation of the properties. The ECU 10 can correct the injection amounts of these intake stroke injections.

Then, at Step S64, the ECU 10 outputs the electric signals to the injector 6, the first spark plug 251, and the second spark plug 252 in consideration of the contents of the correction at above-described Step S63. After Step S64, the process returns.

Thus, even if the actual in-cylinder properties deviate from the target in-cylinder properties, the target combustion state can be achieved by correcting them using the injector 6, the first spark plug 251, and the second spark plug 252. Therefore, the HCCI combustion and the MPCI combustion, where the in-cylinder properties greatly contribute to the ignition, can be stably performed also during the transition state where the in-cylinder properties vary.

Therefore, in this embodiment, the ECU 10 which received the detection signal from the accelerator opening sensor SW7 which detects the operation of the accelerator pedal of the vehicle sets the target torque of the engine 1 in the specific cycle in the future by the given delay time from the present time based on the present accelerator opening (target torque setting block B1). The ECU 10 selects beforehand the combustion in the specific cycle according to the set target torque, from the SI combustion or the SPCCI combustion in which the fuel inside the cylinder 11 is forcibly ignited using the first spark plug 251 and/or the second spark plug 252, and the HCCI combustion or the MPCI combustion in which the fuel inside the cylinder 11 carries out the compressed self-ignition without using the first spark plug 251 and the second spark plug 252 (combustion mode setting block B2). The ECU 10 outputs the control signals to the property adjusting device (the intake S-VT 231, the intake CVVL 232, the exhaust S-VT 241, the exhaust VVL 242, the throttle valve 43, and the EGR valve 54) before the specific cycle so that the properties inside the cylinder 11 in the specific cycle become the properties corresponding to the selected combustion (property controlling block B3). The ECU 10 estimates the properties at the timing when the intake valve 21 is closed in the specific cycle based on the sensor signals measured in the specific cycle (property estimating block B4). The ECU 10 outputs the control signal corresponding to the estimated properties to the first spark plug 251 and/or the second spark plug 252 or the injector 6 so that the preselected combustion is realized in the specific cycle (ignition/injection controlling block B5).

Therefore, since the target properties in the future cycle are set beforehand, the ECU 10 can output the control signal to the property adjusting device beforehand. As a result, the properties inside the cylinder 11 in the specific cycle can become the target properties. Also during the transition state where the target torque of the engine 1 changes every moment, since the properties inside the cylinder 11 in each cycle become the target properties, the combustion becomes stable also when the HCCI combustion or the MPCI combustion is performed in the cycle.

Further, even if the properties inside the cylinder 11 in the specific cycle deviate from the target properties, the SI combustion/the SPCCI combustion, or the HCCI combustion/the MPCI combustion in the specific cycle is optimized by adjusting the ignition timings of the first spark plug 251 and/or the second spark plug 252, and/or the injection timing or the injection amount of the injector 6 in the specific cycle according to the properties. Thus, it can also stabilize the HCCI combustion or the MPCI combustion during the transition state.

In this embodiment, the ECU 10 performs the preselection of combustion for every cylinder 11 (Step S24, FIG. 10). Therefore, in the multi-cylinder engine having the plurality of the cylinders 11, combustion of each cylinder 11 corresponds to the target torque in the transition state where the target torque changes for every cylinder 11.

Further, in this embodiment, the ECU 10 outputs the control signal to at least one of the devices comprised of the throttle valve 43, the variable valve operating mechanisms (the intake S-VT 231, the intake CVVL 232, the exhaust S-VT 241, and the exhaust VVL 242), and the EGR valve 54, before the specific cycle (Step S36, FIGS. 13A and 13B). Therefore, since these devices with bad responses can start the operation beforehand, the properties in the specific cycle can be the target properties, or can be brought closer to the target properties.

Further, in this embodiment, the ECU 10 estimates the properties at the timing when the intake valve 21 is closed, before the intake valve 21 is closed in the specific cycle (Step S61). By estimating the properties before the intake valve 21 is closed, the ECU 10 can output the control signal corresponding to the properties even before the intake valve 21 is closed (Step S64, FIG. 6).

Further, in this embodiment, the ECU 10 estimates at least the in-cylinder temperature at the timing when the intake valve 21 is closed, and outputs at least the control signal to the injector 6 (Steps S61 and S64, FIG. 6). The HCCI combustion or the MPCI combustion is optimized by adjusting the injection amount and/or the injection timing of fuel into the cylinder 11 at least according to the temperature inside the cylinder 11.

Other Embodiments

The technique disclosed herein is not limited to the above embodiment, and it can be substituted within a range not departing from the subject matter of the appended claims.

The technique disclosed herein is not limited to the application to the engine 1, but it can be applied to engines with various configurations.

Moreover, in each of the flowcharts described above, the order of the steps is not restrictive, but it may be changed, or a plurality of steps may be performed in parallel. Further, some of the steps may be omitted, or a new step may be added.

The above embodiment is merely illustration, and therefore, the scope of the present disclosure must not be interpreted restrictively. The scope of the present disclosure is defined by the claims, and all of the modifications and the changes which belong to the equivalents of the claims are encompassed in the scope of the present disclosure.

INDUSTRIAL APPLICABILITY

The technique disclosed herein is useful as the method of controlling the engine which is mounted on the vehicle and has the injector, the spark plug, and the property adjusting device, or useful as the engine system.

DESCRIPTION OF REFERENCE CHARACTERS

1 Engine
10 ECU (Controller)
11 Cylinder
21 Intake Valve
22 Exhaust Valve
231 Intake S-VT (Variable Valve Operating Mechanism)
232 Intake CVVL (Variable Valve Operating Mechanism)
241 Exhaust S-VT (Variable Valve Operating Mechanism)
242 Exhaust VVL (Variable Valve Operating Mechanism)
251 First Spark Plug
252 Second Spark Plug
43 Throttle Valve
54 EGR Valve
6 Injector
E Engine System
SW4 In-cylinder Pressure Sensor
SW7 Accelerator Opening Sensor (Accelerator Operation Detector)

What is claimed is:

1. A method of controlling an engine, comprising the steps of:
setting, by a controller, a target torque of the engine in a specific cycle in the future by a given delay time from a present time based on a present accelerator opening, in response to reception of a detection signal from an accelerator operation detector;
preselecting, by the controller, combustion in the specific cycle according to the target torque, from flame propagation combustion in which fuel inside a cylinder is forcibly ignited using a spark plug and compressed self-ignition combustion in which fuel inside the cylinder carries out compressed self-ignition without using the spark plug;
outputting, by the controller, a control signal to a property adjusting device before the specific cycle so that a property inside the cylinder in the specific cycle becomes a property corresponding to the selected combustion;
estimating, by the controller, the property at a timing when an intake valve is closed in the specific cycle based on a sensor signal measured in the specific cycle; and
outputting, by the controller, a control signal corresponding to the estimated property to the spark plug or an injector so that the preselected combustion is realized in the specific cycle.

2. The method of claim 1, wherein the controller performs the preselection of combustion for every cylinder.

3. The method of claim 1, wherein the property adjusting device includes at least one of a throttle valve, a variable valve operating mechanism, and an exhaust gas recirculation (EGR) valve.

4. The method of claim 2, wherein the property adjusting device includes at least one of a throttle valve, a variable valve operating mechanism, and an exhaust gas recirculation (EGR) valve, before the specific cycle.

5. The method of claim 1, wherein the controller estimates the property at a timing when the intake valve is closed, before the intake valve is closed in the specific cycle.

6. The method of claim 2, wherein the controller estimates the property at a timing when the intake valve is closed, before the intake valve is closed in the specific cycle.

7. The method of claim 3, wherein the controller estimates the property at a timing when the intake valve is closed, before the intake valve is closed in the specific cycle.

8. The method of claim 4, wherein the controller estimates the property at a timing when the intake valve is closed, before the intake valve is closed in the specific cycle.

9. The method of claim 1, wherein the controller estimates at least a temperature inside the cylinder at a timing when the intake valve is closed, and outputs the control signal at least to the injector.

10. The method of claim 2, wherein the controller estimates at least a temperature inside the cylinder at a timing when the intake valve is closed, and outputs the control signal at least to the injector.

11. The method of claim 3, wherein the controller estimates at least a temperature inside the cylinder at a timing when the intake valve is closed, and outputs the control signal at least to the injector.

12. The method of claim 4, wherein the controller estimates at least a temperature inside the cylinder at a timing when the intake valve is closed, and outputs the control signal at least to the injector.

13. The method of claim 5, wherein the controller estimates at least a temperature inside the cylinder at the timing when the intake valve is closed, and outputs the control signal at least to the injector.

14. The method of claim 6, wherein the controller estimates at least a temperature inside the cylinder at the timing when the intake valve is closed, and outputs the control signal at least to the injector.

15. The method of claim 7, wherein the controller estimates at least a temperature inside the cylinder at the timing when the intake valve is closed, and outputs the control signal at least to the injector.

16. The method of claim 8, wherein the controller estimates at least a temperature inside the cylinder at the timing when the intake valve is closed, and outputs the control signal at least to the injector.

17. An engine system, comprising:
an engine mounted on a vehicle and having an injector, a spark plug, and a property adjusting device;
an accelerator operation detector configured to detect operation of an accelerator pedal of the vehicle; and
a controller configured to output a control signal to each of the injector, the spark plug, and the property adjusting device, based on a detection signal from the accelerator operation detector,
wherein the engine selectively performs flame propagation combustion in which fuel injected into a cylinder from the injector is forcibly ignited using the spark plug, and compressed self-ignition combustion in which fuel injected into the cylinder from the injector carries out compressed self-ignition without using the spark plug, and
wherein the controller is configured to:
receive the detection signal from the accelerator operation detector, and set a target torque of the engine in a specific cycle in the future by a given delay time from a present time, based on a present accelerator opening;
preselect combustion in the specific cycle according to the target torque from the flame propagation combustion and the compressed self-ignition combustion;
output a control signal to the property adjusting device before the specific cycle so that a property inside the cylinder in the specific cycle becomes a property corresponding to the selected combustion;
estimate the property at a timing when an intake valve is closed in the specific cycle, based on a sensor signal measured in the specific cycle; and
output a control signal corresponding to the estimated property to the spark plug or the injector so that the preselected combustion is realized in the specific cycle.

* * * * *